(12) United States Patent
Amirfazli

(10) Patent No.: US 10,753,842 B2
(45) Date of Patent: Aug. 25, 2020

(54) SYSTEMS AND METHODS FOR MEASURING PHYSIOCHEMICAL PROPERTIES OF INTERFACES USING DROPLETS OR BUBBLES

(71) Applicant: Alidad Amirfazli, Toronto (CA)

(72) Inventor: Alidad Amirfazli, Toronto (CA)

( * ) Notice: Subject to any disclaimer, the term of this patent is extended or adjusted under 35 U.S.C. 154(b) by 0 days.

(21) Appl. No.: 15/479,213

(22) Filed: Apr. 4, 2017

(65) Prior Publication Data

US 2017/0284921 A1 Oct. 5, 2017

Related U.S. Application Data

(60) Provisional application No. 62/317,780, filed on Apr. 4, 2016.

(51) Int. Cl.
*G01N 13/02* (2006.01)
*F16M 11/22* (2006.01)
(Continued)

(52) U.S. Cl.
CPC .......... *G01N 13/02* (2013.01); *F16M 11/041* (2013.01); *F16M 11/046* (2013.01);
(Continued)

(58) Field of Classification Search
None
See application file for complete search history.

(56) References Cited

U.S. PATENT DOCUMENTS 5,110,615 A * 5/1992 Maiorca ............. H05K 13/0469
156/356
5,268,733 A * 12/1993 Wright .................. G01B 11/26
356/138

(Continued)

FOREIGN PATENT DOCUMENTS

CN 205691462 U 11/2016
CN 205691463 U 11/2016

(Continued)

OTHER PUBLICATIONS

Functionalsurfaces, "Simple Contact Angle Measurement using a Smartphone (Advanced Instructions)", Mar. 26, 2015, https://www.youtube.com/watch?v=Y9IJcxBDpzU.*

(Continued)

*Primary Examiner* — Edemio Navas, Jr.
(74) *Attorney, Agent, or Firm* — Bhole IP Law; Anil Bhole; Marc Lampert

(57) ABSTRACT

Systems, methods, and computer program products for measurement of surface properties using a mobile device are described, the surface properties including interfacial (surface) tension, contact angle (static, advancing, or receding), solid surface energy, and rolling or sliding angle on an inclined surface. The system has a support adapted to receive a mobile device with a camera and a processor. A structure is coupled to the support that is adapted to removably receive measurement components. The measurement components are configurable to place a droplet or a bubble within a field of view of the camera. Software on the mobile device is configured to operate the camera to take an image of the droplet or the bubble within the field of view of the camera, and to determine one or more physical properties of the droplet or the bubble based on an analysis of the image.

19 Claims, 20 Drawing Sheets

(51) Int. Cl.

| | |
|---|---|
| *G01B 11/255* | (2006.01) |
| *G06T 7/62* | (2017.01) |
| *G06T 7/80* | (2017.01) |
| *H04N 5/225* | (2006.01) |
| *H04N 5/232* | (2006.01) |
| *F16M 13/02* | (2006.01) |
| *F16M 11/04* | (2006.01) |
| *F16M 13/00* | (2006.01) |

(52) U.S. Cl.
CPC ............ *F16M 11/22* (2013.01); *F16M 13/00* (2013.01); *F16M 13/022* (2013.01); *G01B 11/255* (2013.01); *G06T 7/62* (2017.01); *G06T 7/80* (2017.01); *H04N 5/2256* (2013.01); *H04N 5/23216* (2013.01); *H04N 5/23296* (2013.01); *G01N 2013/0208* (2013.01); *G01N 2013/0241* (2013.01); *G06T 2207/10004* (2013.01)

(56) References Cited

U.S. PATENT DOCUMENTS

| | | | | |
|---|---|---|---|---|
| 2009/0180106 | A1* | 7/2009 | Friedrich | G01N 13/02 356/138 |
| 2010/0024529 | A1* | 2/2010 | Dillingham | G01N 13/02 73/64.52 |
| 2010/0201836 | A1* | 8/2010 | Kim | G03B 21/06 348/222.1 |
| 2013/0071590 | A1* | 3/2013 | Herbots | A61L 27/34 428/35.7 |
| 2013/0151111 | A1* | 6/2013 | Skelton | B60R 25/00 701/99 |
| 2013/0330543 | A1* | 12/2013 | Ruda | C09D 5/00 428/341 |
| 2015/0281587 | A1* | 10/2015 | Furuta | B60R 1/00 348/240.2 |
| 2015/0371396 | A1* | 12/2015 | Bhowmick | G06T 7/80 382/154 |
| 2016/0140735 | A1* | 5/2016 | Williams | G06L 7/60 348/135 |

FOREIGN PATENT DOCUMENTS

| | | | |
|---|---|---|---|
| EP | 3009828 A1 | 4/2016 | |
| JP | 2016138843 A | 8/2016 | |
| WO | WO 2015130597 A1 * | 9/2015 | ............ G01N 13/02 |

OTHER PUBLICATIONS

Mazzola et al., "An easy way to measure surface free energy by drop shape analysis," Sciencedirect, vol. 45, Issue 3, Apr. 2012, p. 317-324, https://www.sciencedirect.com/science/article/pii/S0263224111004234.*

Kruss, "Universal Analysis of wettability and adhesion | DSA100," Oct. 15, 2015, https://www.youtube.com/watch?v=2LfTrgmleAY.*

Mina Hoorfar et al., "Axisymmetric Drop Shape Analysis (ADSA) for the determination of surface tension and contact angle", The Journal of Adhesion, 80—Aug. 2004, pp. 727-743.*

"Simple Contact Angle Measurement using a Smartphone (Advanced Instructions", posted at youtube.com, available from the Internet, URL: https://www.youtube.com/watch?v=Y9IJcxBDpzU.

"68-76 PocketGoniometer PGX+", the tmigroup, posted at youtube.com, available from the internet, URL: https://www.youtube.com/watch?v=L7fMn6so2s.

"Simple and Low-cost Contact Angle Measurements Using a Smartphone with a PDMS-Lens", McKenna et al., Chips and Tips (on-line), Jul. 19, 2016, available from the internet, URL: http:blogs.rsc.org/chipsandtips/2016/07/19/simple-and-low-cost-contact-angle-measurements-using-a-smartphone-with-a-pdms-lens/.

International Search Report and Written Opinion received in corresponding International Patent Application No. PCT/CA2017/050412, dated Jun. 15, 2017.

"Contact Angle Measurements Using Cellphone Cameras to Implement the Bikerman Method", Williams et al., Galvanotechnik, Aug. 2011, pp. 1718-1725.

"Chapter 1—Contact Angle and Wetting Properties", Yuan et al., Surface Science Techniques, vol. 51 of the series Springer Series in Surface Sciences, 2013, pp. 3-34.

"Contact Angle Measurements Using a Simplified Experimental Setup", Lamour et al., Journal of Chemical Education, vol. 81 No. 12, Dec. 2010, pp. 1403-1407.

\* cited by examiner

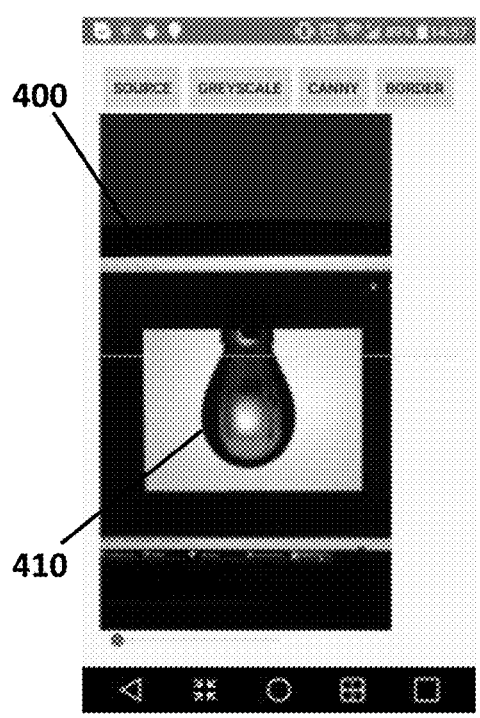 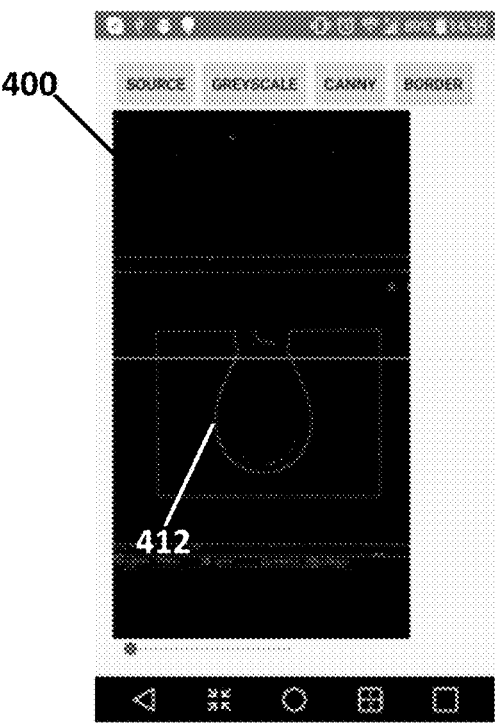
FIG. 4A  FIG. 4B
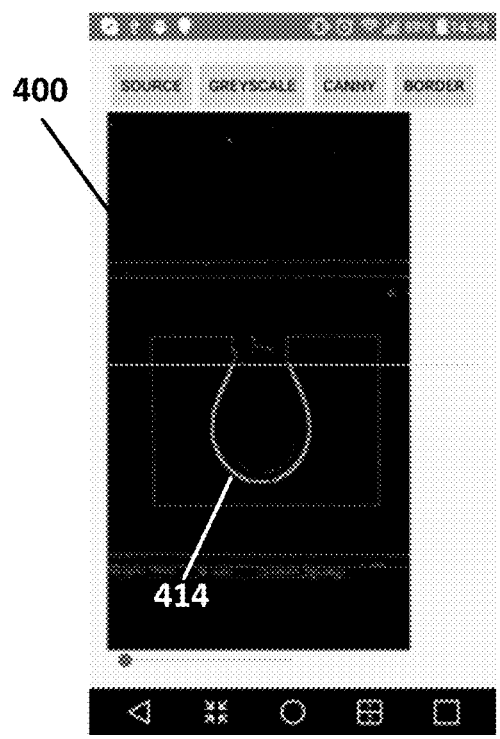 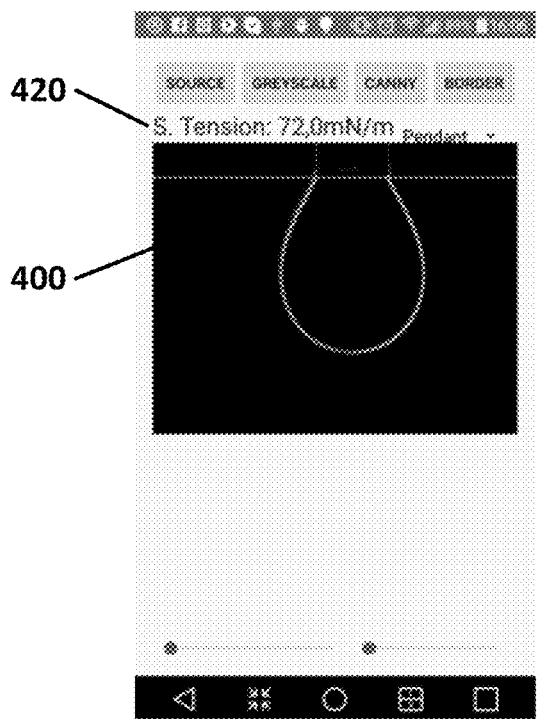
FIG. 4C  FIG. 4D

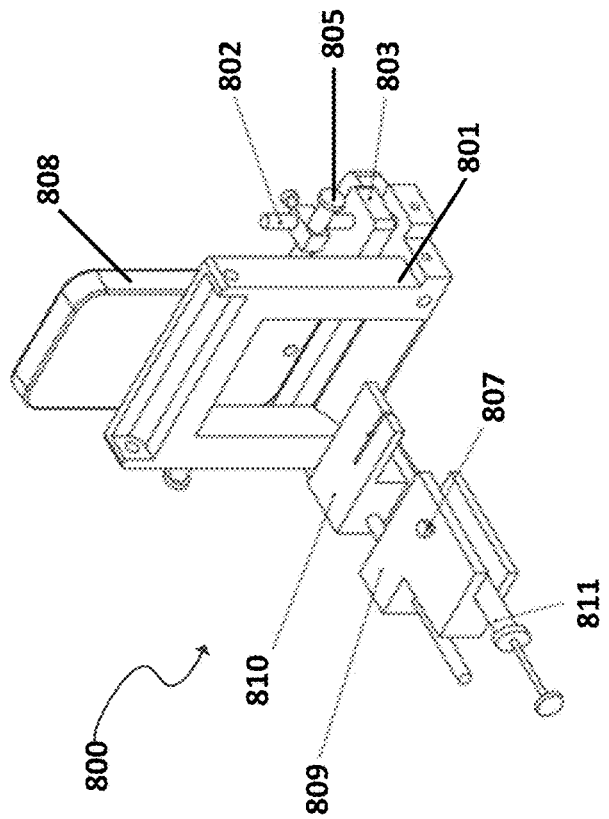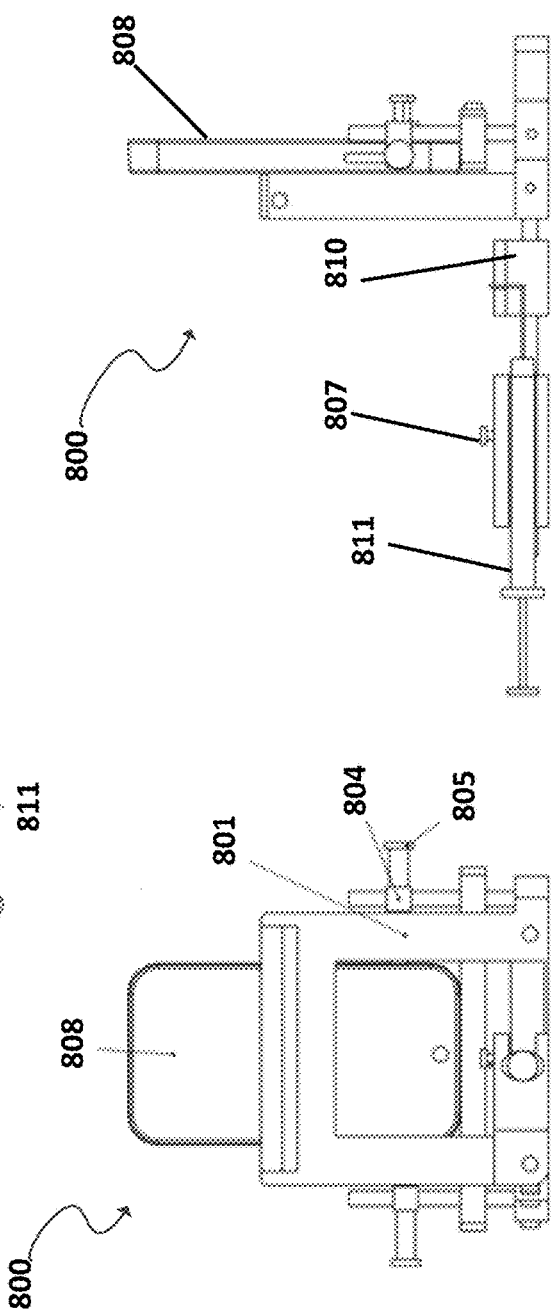

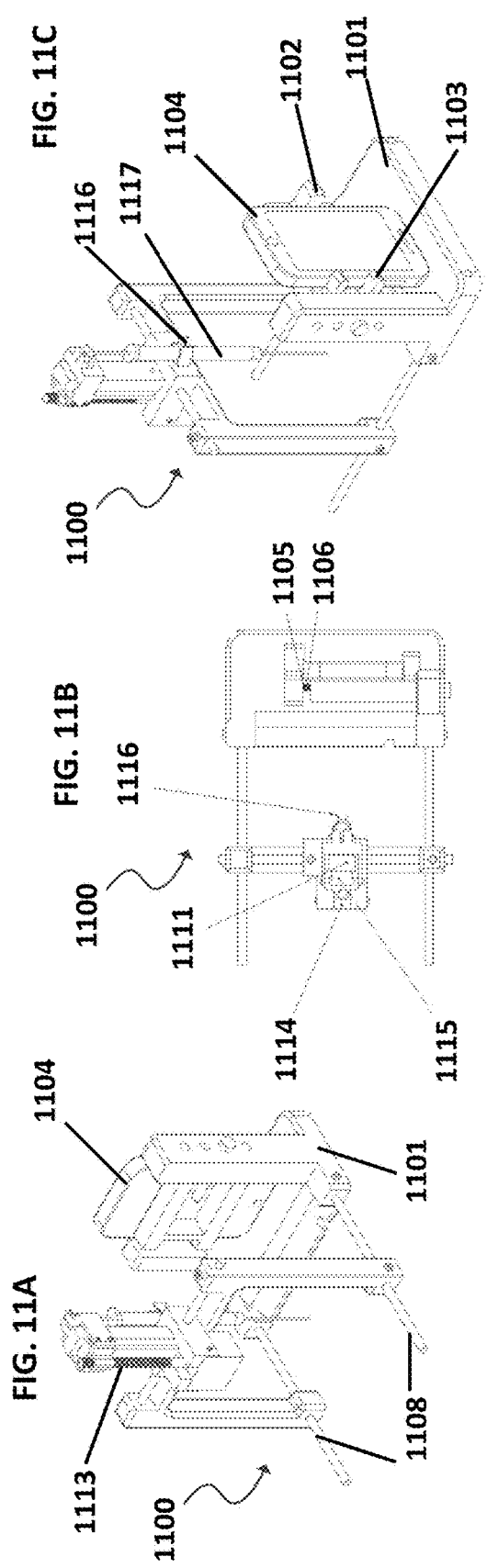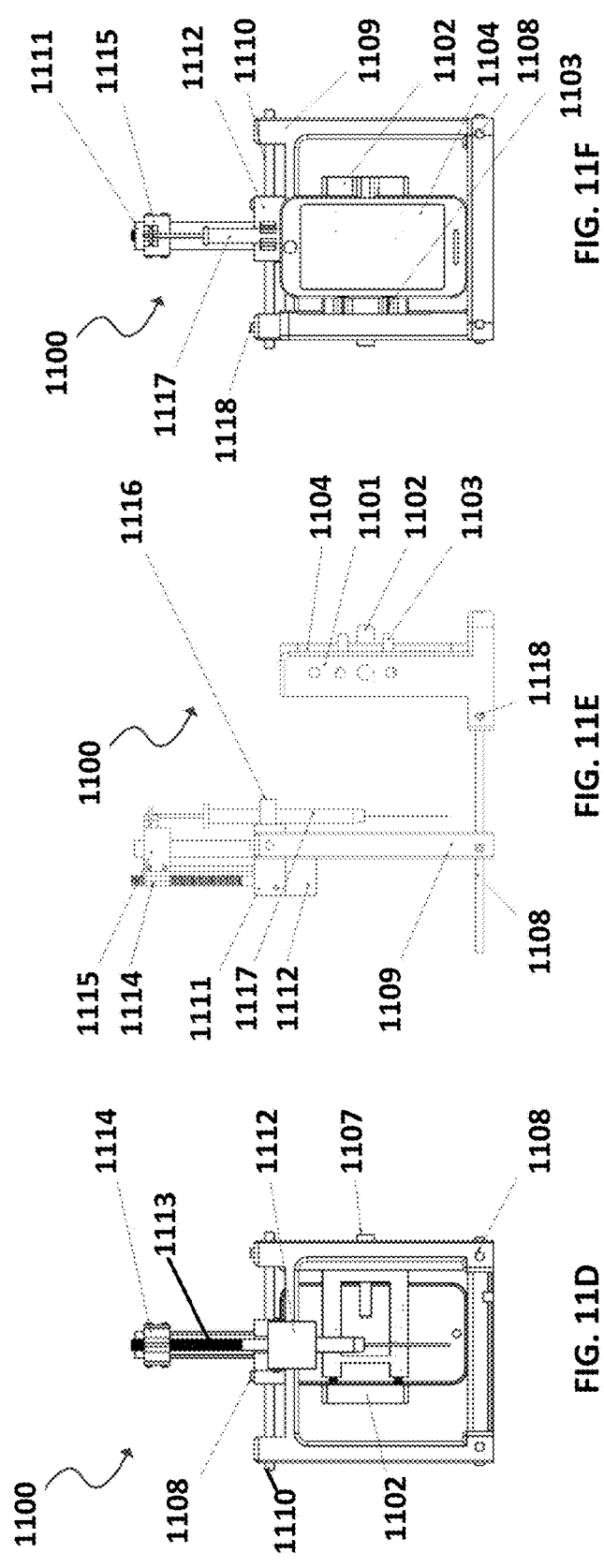

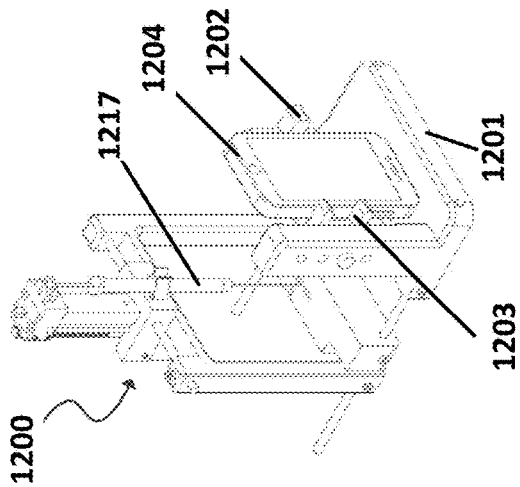
FIG. 12C
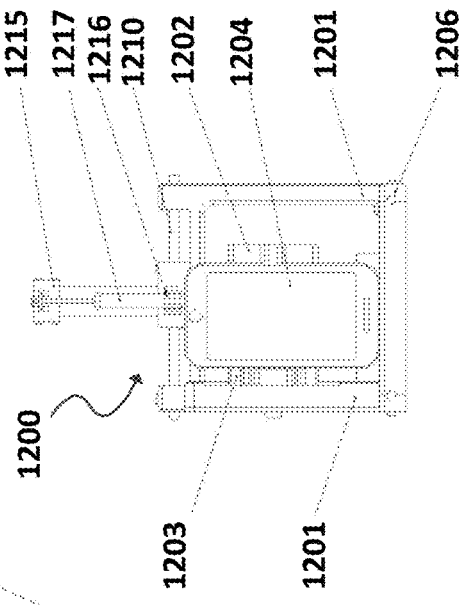
FIG. 12F
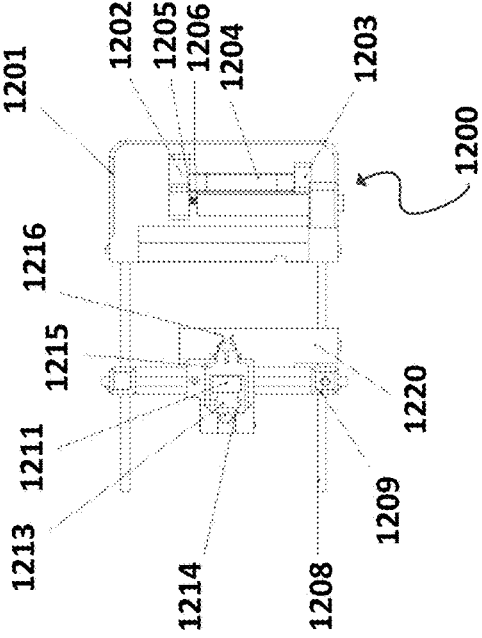
FIG. 12B
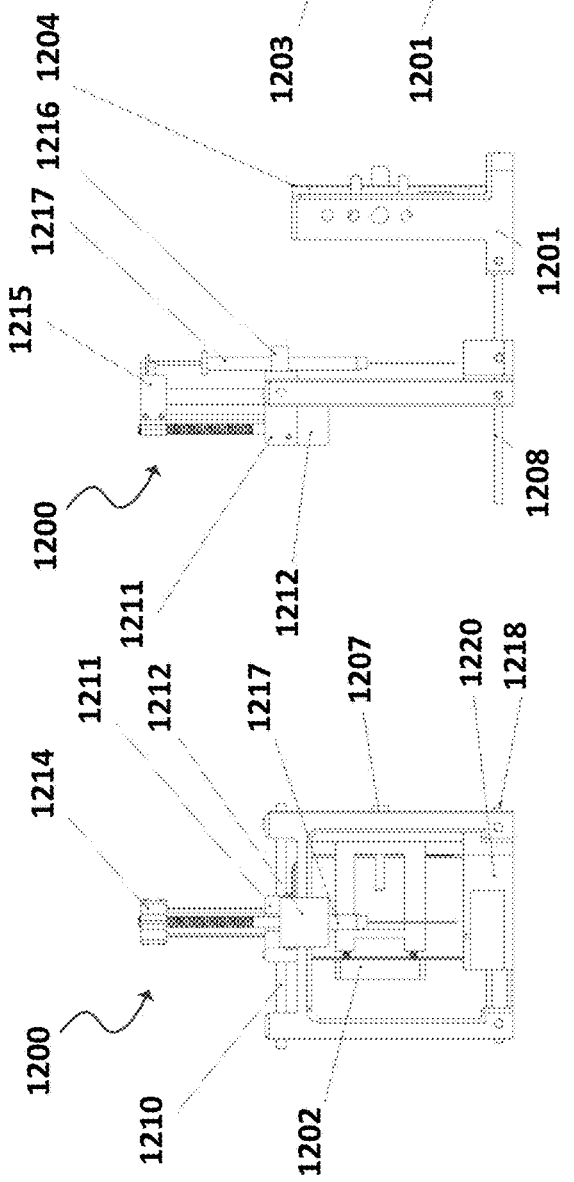
FIG. 12E
FIG. 12D
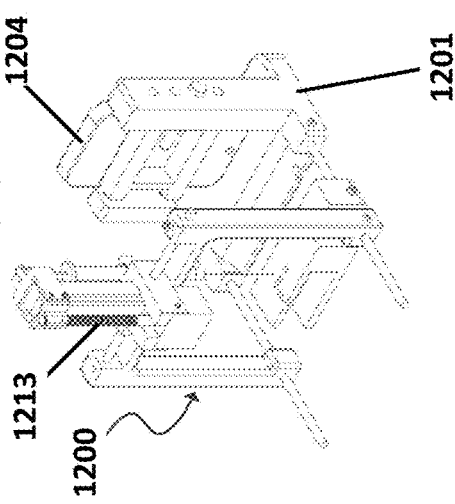
FIG. 12A

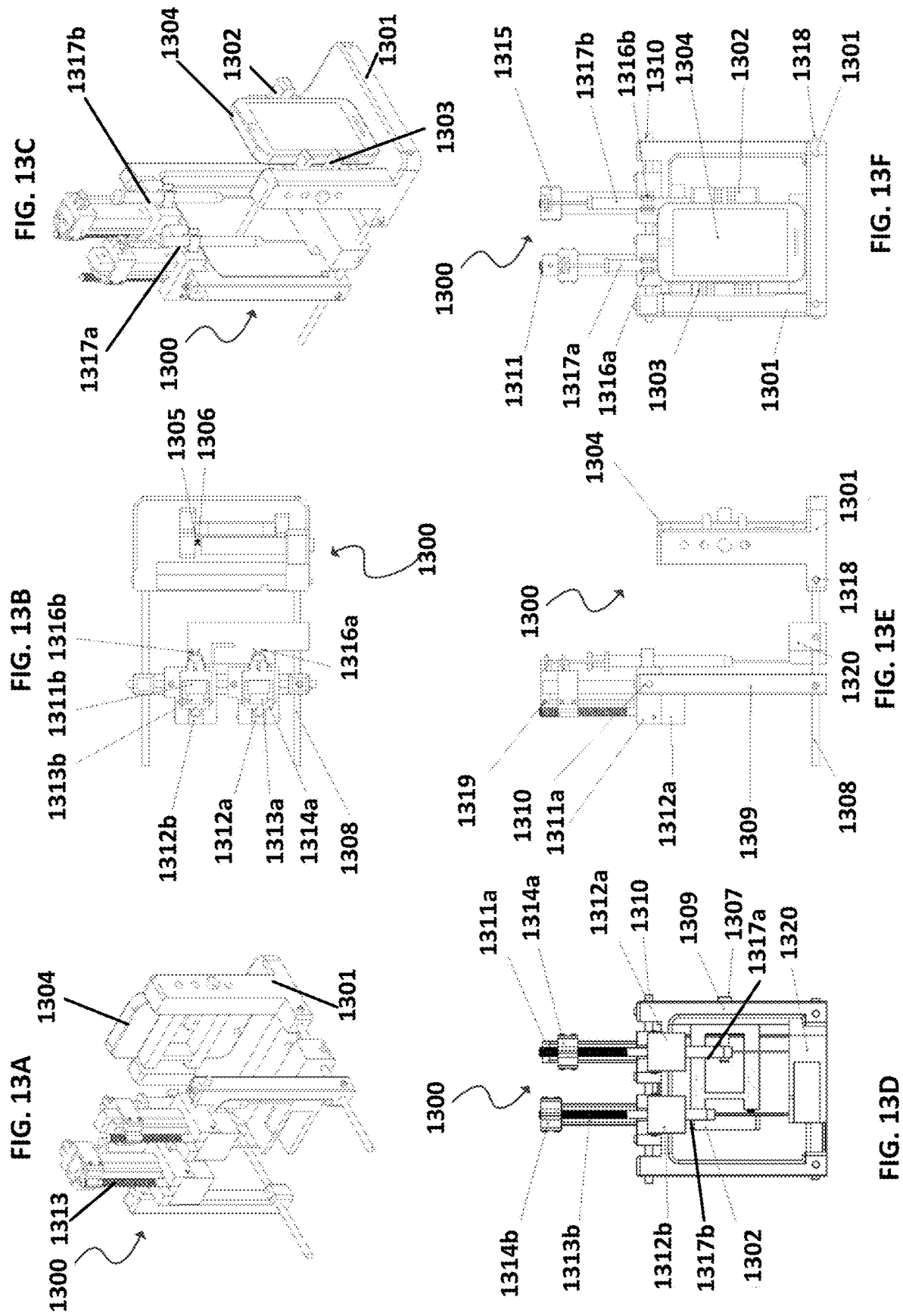

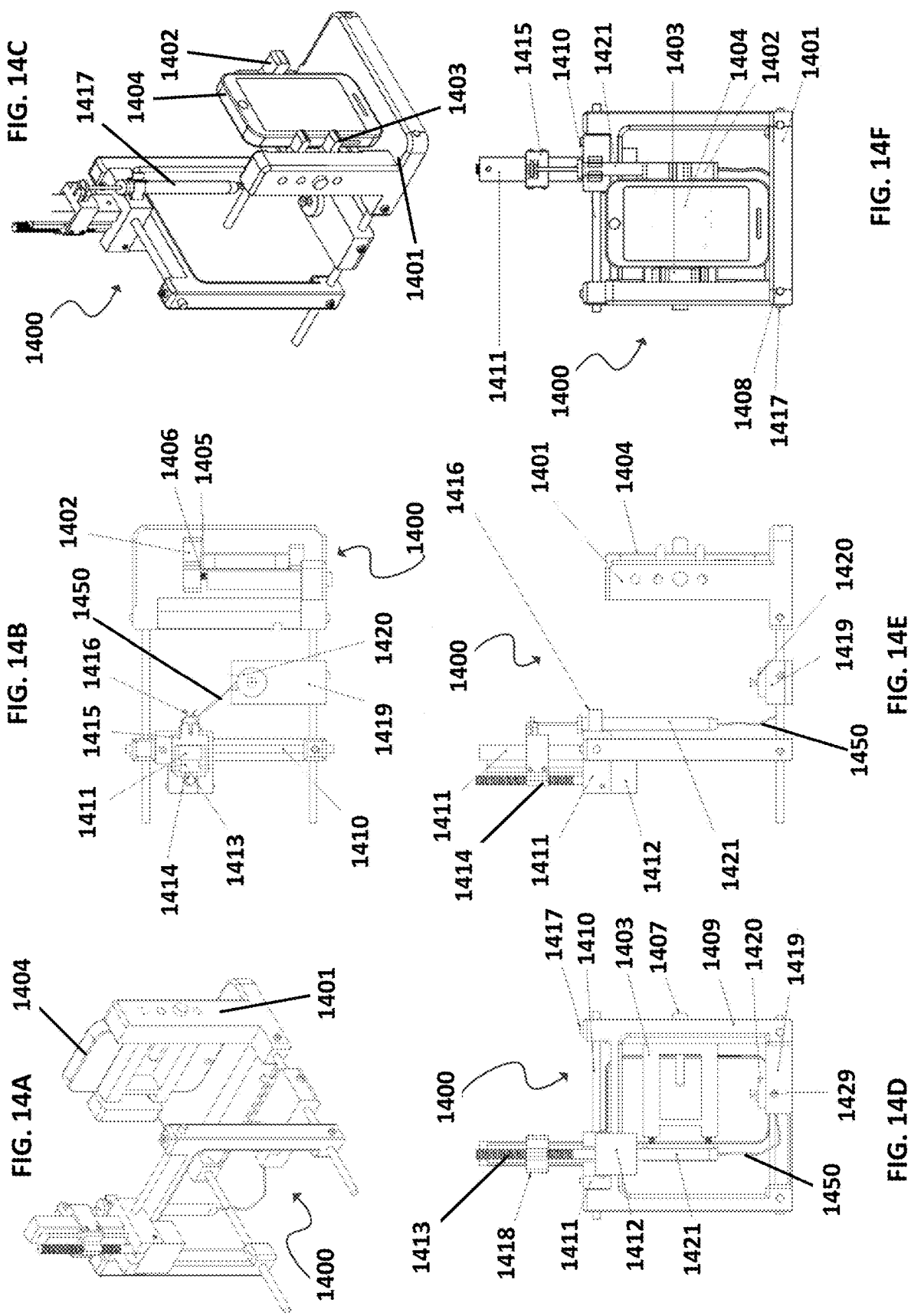

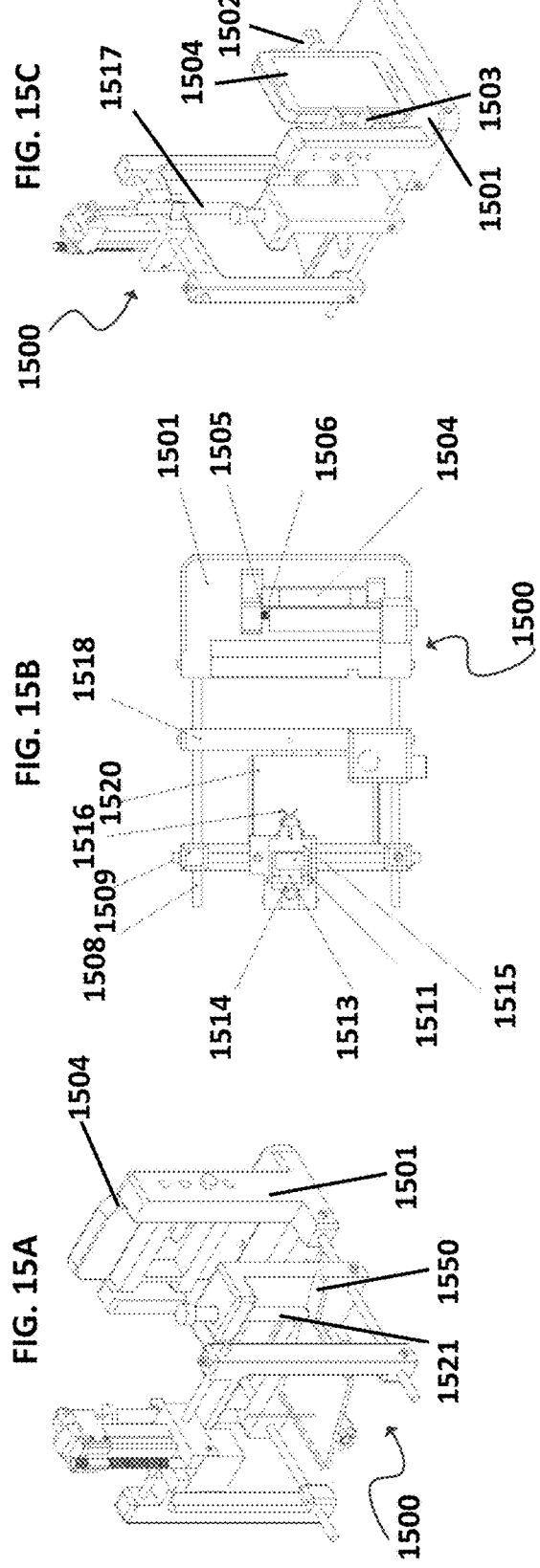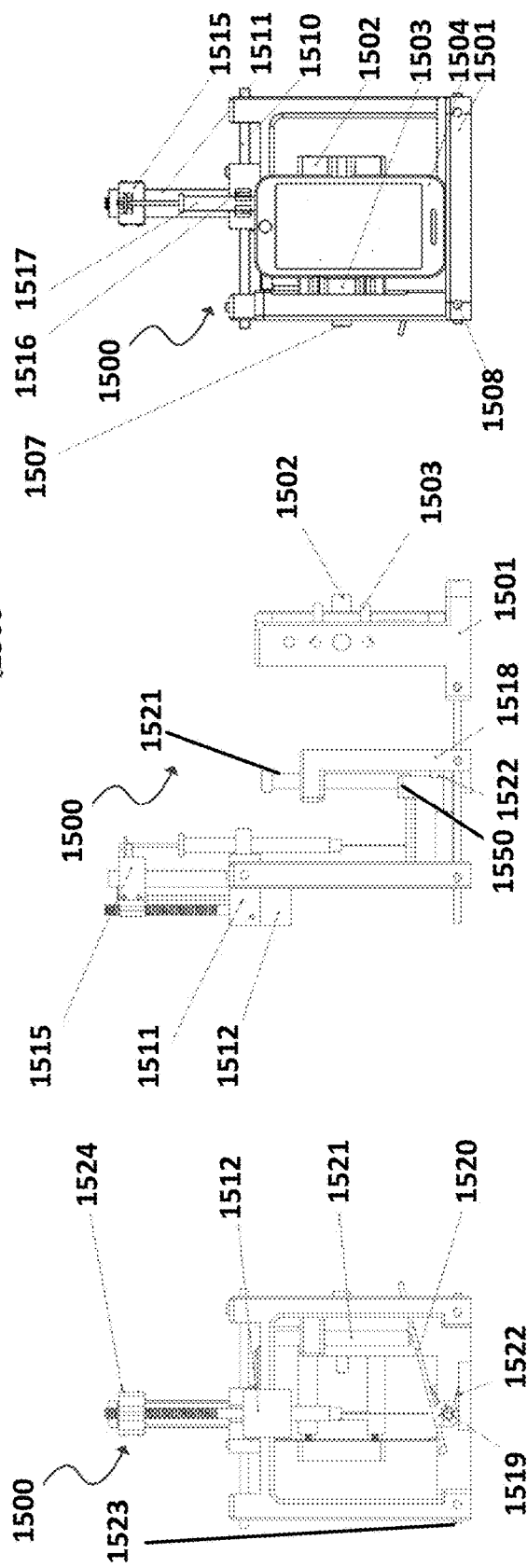

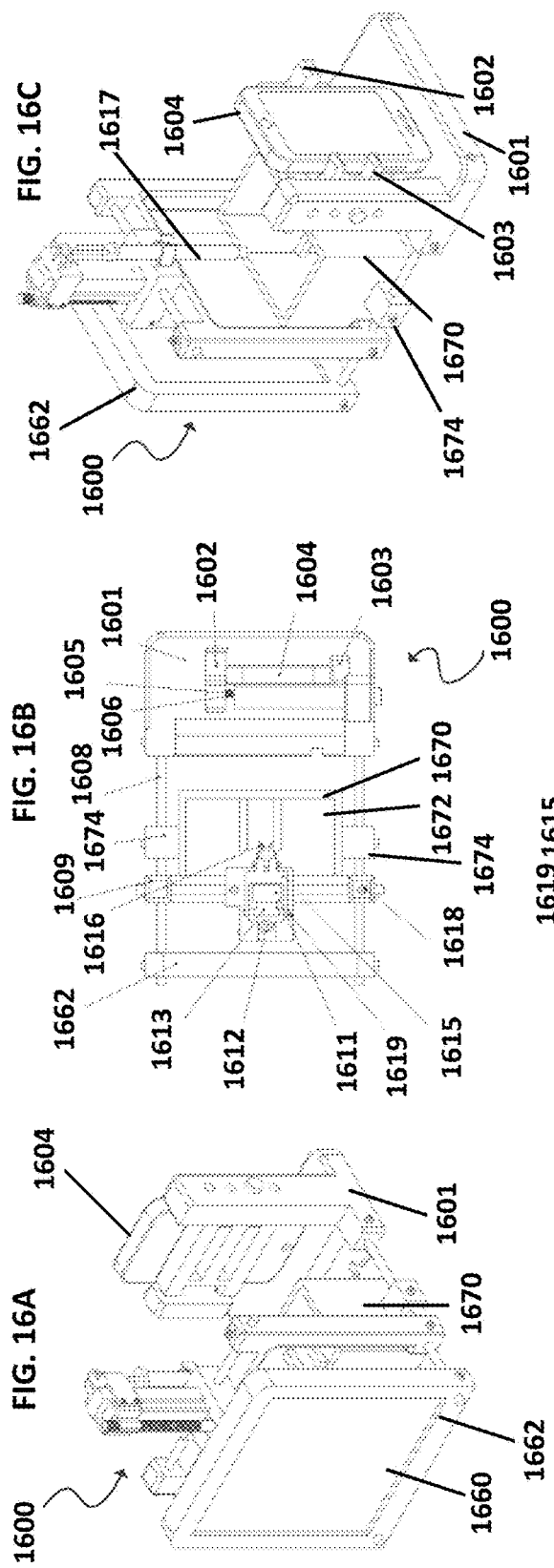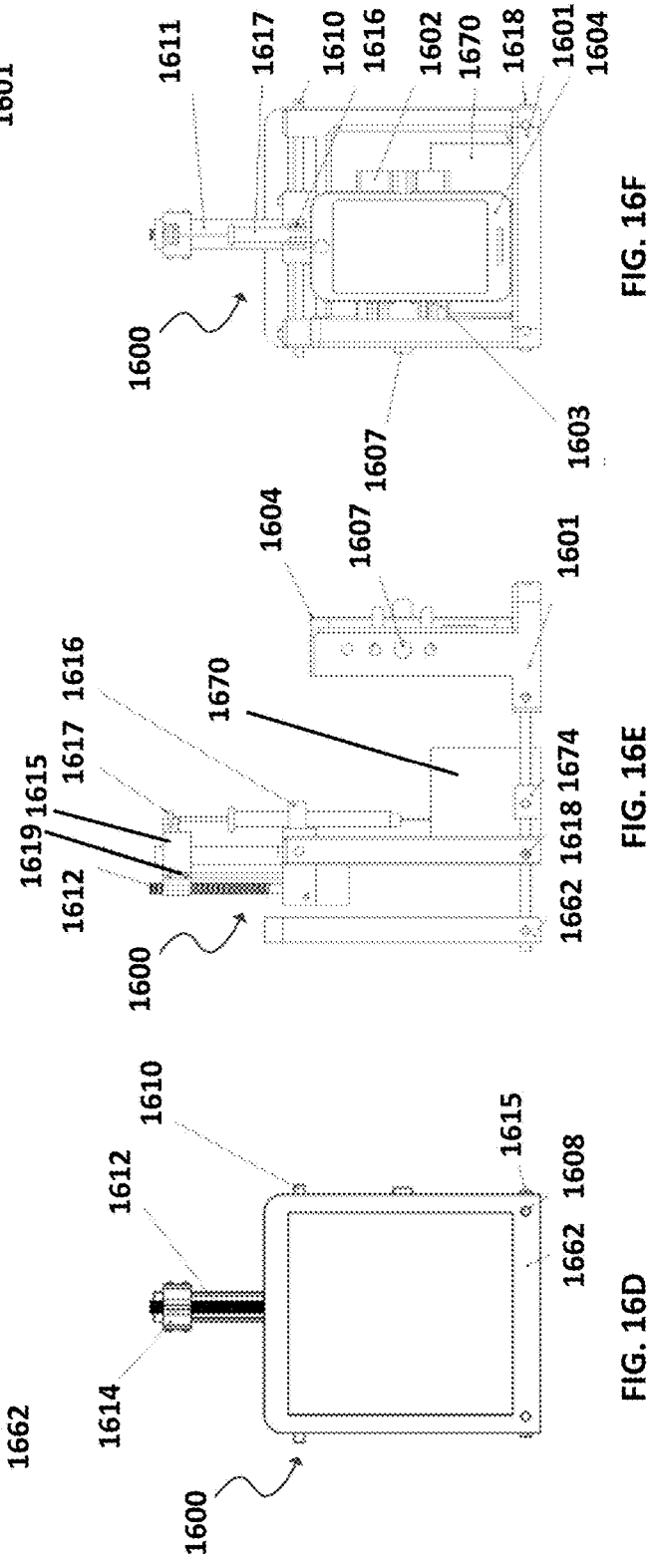

SYSTEMS AND METHODS FOR MEASURING PHYSIOCHEMICAL PROPERTIES OF INTERFACES USING DROPLETS OR BUBBLES

CROSS REFERENCE TO RELATED APPLICATIONS

This application claims priority to U.S. Provisional Patent Application Ser. No. 62/317,780 filed on Apr. 4, 2016, the entire contents of which is incorporated by reference herein.

FIELD

The present disclosure relates generally to the field of measurement, and, more particularly, to systems, methods, kits, and computer program products for measurement of surface and interfacial properties using a mobile device.

BACKGROUND

Contact angle, i.e., the angle between a solid surface and the liquid-air interface for a liquid droplet on the solid surface, measured through the liquid phase, is a fundamental quantity in surface science[1,2]. Contact angle is of practical importance for characterising the wettability of solid surfaces to provide information about surface heterogeneity and roughness, solid surface energy, and liquid spreading[2-8]. As such, knowing contact angle value is important for technological advancement, or scientific understanding, in a variety of areas such as: the chemical industry, the development of coatings, understanding froth floatation, the pharmaceutical industry, petroleum recovery, polymer testing, the printing industry, the semiconductor industry, the paper industry, and development of adhesives[8-12]. The unit for specifying contact angle is degrees.

Surface (or interfacial) tension is a manifestation of the imbalance of molecular forces that any interface between two bulk phases (e.g., solid-liquid or liquid-gas) experiences. Knowing the value of surface tension provides many insights for various topics, e.g., adsorption rate of surfactants, spreading coefficient, stability of an interface, possibility of coalesce, emulsions formulation, just to name but a few. As such, knowing the value of the surface tension is important for many scientific/industrial fields, e.g., detergency, petroleum refining, the polymer industry, biomedical engineering, the paint industry, ink formulations, cosmetics, the food industry, textiles, etc.[1,13]. The unit for specifying surface tension unit is $J/m^2$ or $N/m$.

In view of the above, having an instrument to determine the value of contact angle and surface tension has a very broad appeal and application to academia and a wide range of industries, including related research and development or quality assurance. It is also clear that training students to be able to measure and interpret such data can be important for training of chemists, chemical and material engineers, as well as practitioners of other science and engineering disciplines. The knowledge of sliding or rolling angle is also very important for study of drop shedding and drop/bubble adhesion[17]. Analysis of constrained sessile drops has also shown great potential for study of systems with surfactants where very low surface or interfacial tension is expected[18]. However, commercially available instruments capable of determining the value of contact angle and surface tension often cost several thousands of dollars[14]. As such, this equipment is not sufficiently inexpensive to be used for training of students in the numbers that are needed in a teaching lab. Having a measurement instrument available at a lower price could open or create additional educational and training markets.

Contact angle measurement techniques are mainly divided into two categories. The first category, force tensiometry methods, measures the liquid-solid interaction force, and relates it to the contact angle through the Young equation[2], e.g., using the Wilhelmy plate method. The second category is optical tensiometry methods, where contact angle is measured directly, e.g., using a droplet placed on a solid surface[15], and deciphering the contact angle from the droplet/bubble image through Drop Shape Analysis (DSA) (e.g., by image processing methods to find the drop/bubble outline and then determining the contact angle by fitting the drop outline to a circle, ellipse, polynomial, or through a solution of the Laplace equation, or an augmented Laplace equation, e.g., in circumstances when an electrical field is present). Since the early 1980s, digital image processing methods have been used for DSA[16], and such methods have continuously improved. A drawback of the force tensiometry methods is that they rely on the applicability of the Young equation. However, in most practical cases an apparent (macroscopic) contact angle is seen or used, which is different from the equilibrium contact angle needed for the Young equation; hence, optical methods are preferred[19]. Other advantages of optical methods include a small sample liquid requirement and the applicability of optical methods to surface samples of different sizes or shapes.

Similar to contact angle measurement, surface tension can be measured with force tensiometry methods, e.g., the duNouy ring method. However, DSA methods are popular due to their advantages of being a non-contact method, requiring small sample sizes, accuracy, convenience, versatility (e.g., the ability to conduct static or dynamic measurements), and ease of reconfiguration for high pressure or temperature measurements. In DSA methods, an image is taken from a drop or bubble—usually a pendent drop, captive bubble, or a constraint sessile drop, or a drop on an inclined surface—and the drop or bubble's outline is found by image processing, and then it is fitted to the numerical solution of the Laplace equation. The best theoretical representation of the experimentally found (imaged) profile will allow surface/interfacial tension to be found. The theoretical solutions of the Laplace equation are found by assuming a surface or interfacial tension value, and knowledge of a number of other parameters, such as the densities of fluids involved, as described for example in *Applied Surface Thermodynamics*, 2nd Edition, A. W. Neumann, R David, Y Zuo, 2010, CRC Press, NY, USA.

Since their advent in the 1980s, computerized DSA systems have generally had a standard system design as illustrated in FIG. 1. A droplet 102 is positioned by a syringe 112 (either from bottom or top) between a camera 104 connected to a lens 106 and a light source 108. An optical diffuser 110 may be positioned between the light source 108 and the droplet 102. The camera 104 is then connected to an external computer and monitor (not shown). This arrangement lends itself to a bulky system as bound to be placed on a table. Industry demand for on-site (field) measurements has very recently compelled a few manufacturers to offer smaller, transportable versions of such instruments at prices exceeding $15,000 USD and which are still tethered to a computer[20] and cannot be used to measure surface tension of liquids.

SUMMARY

Systems, methods, and computer program products are disclosed for using a mobile device to analyze the shape of a droplet or a bubble in order to measure surface properties including interfacial (surface) tension, contact angle (static, advancing, or receding), surface energy, and rolling or sliding angle on an inclined surface.

According to one aspect of the invention, there is provided a system for analyzing one or more physical properties of a droplet or a bubble. The system includes a support adapted to receive a mobile device including a camera and a processor; a structure removably couplable to the support, the structure adapted to removably receive one or more measurement components, each of the one or more measurement components configurable to place the droplet or the bubble within a field of view of the camera, wherein the processor is configured to operate the camera to take an image of the droplet or the bubble within the field of view; and determine one or more physical properties of the droplet or the bubble based on an analysis of the image.

In some embodiments, the mobile device includes a smartphone or a tablet computer. In some embodiments, the mobile device includes an embedded device.

In some embodiments, the one or more physical properties include one or more surface thermodynamic properties.

In some embodiments, the at least one of the one or more measurement components includes a component for supporting a droplet on a horizontal surface, a component for supporting a droplet on a tiltable surface, a component for supporting a pendant droplet, or a component for supporting a droplet on a surface having a constrained area.

In some embodiments, at least one of the one or more measurement components includes a component for generating or manipulating the volume or size of a droplet on a horizontal surface, a component for generating or manipulating the volume or size of a droplet on a tiltable surface, a component for generating or manipulating the volume or size of a pendant droplet, or a component for generating or manipulating the volume or size of a droplet on a surface having a constrained area.

In some embodiments, at least one of the one or more measurement components includes a component for supporting a captive bubble, a component for supporting a bubble floating within a fluid, a component for injecting a bubble into a fluid, or a component for deforming a bubble within a fluid by means of an external force.

In some embodiments, at least one of the one or more measurement components is adapted to generate or manipulate the bubble.

In some embodiments, the determined one or more physical properties is interfacial tension, contact angle, advancing contact angle, receding contact angle, solid surface energy, sliding angle, droplet or bubble surface area, droplet or bubble volume, or apex curvature.

In some embodiments, determining the one or more physical properties includes analyzing the droplet or the bubble shape based on solving the Laplace equation.

In some embodiments, determining the one or more physical properties includes analyzing the droplet or the bubble shape based on polynomial or curve fitting techniques.

In some embodiments, the structure is further configured to removably receive an illumination source for the droplet or the bubble. In some embodiments, at least one of the intensity or duration of light emitted by the illumination source is controllable. In some embodiments, the illumination source is controllable by the mobile device or independently of the mobile device.

In some embodiments, the structure includes one or more motors controllable by the mobile device for adjusting the distance of one or more of the measurement components from the camera. In some embodiments, the structure includes one or more motors controllable by the mobile device for adjusting the position of one or more of the measurement components relative to the camera.

In some embodiments, the structure includes one or more actuators controllable by the mobile device for at least one of injection, withdrawal, or volume or size manipulation of the droplet or the bubble. In some embodiments, the mobile device and the structure are adapted to communicate through a wireless communication protocol for controlling the motor. In some embodiments, the mobile device and the structure are adapted to communicate through a wireless communication protocol for controlling the actuator.

In some embodiments, the support adapted to receive a mobile device is adjustable to accommodate at least one of: mobile devices of various sizes, mobile devices having differing camera placements, and mobile devices having various focal length or optics requirements.

In some embodiments, the mobile device includes an orientation sensor, and wherein the processor is further configured to require that the mobile device has a specified orientation based on data provided by the orientation sensor prior to operating the camera.

In some embodiments, wherein at least one of the support or the structure coupled to the support is adapted to receive a removably couplable optical module that cooperates with the camera when taking the image. In some embodiments, the processor is configured to calibrate the image.

In some embodiments, the mobile device includes an orientation sensor and the processor is configured to use measurements by the orientation sensor to calibrate the image or to allow capturing of the image.

According to another aspect of the invention, there is provided a method for analyzing one or more physical properties of a droplet or a bubble. The method includes inserting a mobile device having a camera into a support; coupling a measurement component to the support; placing a droplet or a bubble on or within the measurement component and within the camera's field of view; and operating the mobile device to: cause the camera to take an image of the droplet or the bubble; and determine one or more physical properties of the droplet or the bubble based on an analysis of the image.

In some embodiments, the method includes the step of operating the mobile device to take the image at the maximum zoom level of the camera. In some embodiments, the method includes operating the mobile device to take the image at an appropriate zoom level for the camera.

In some embodiments, the one or more physical properties include one or more surface thermodynamic properties.

In some embodiments, the method includes the steps of operating the mobile device to cause the camera to take a plurality of images spaced apart in time, and determining the one or more physical properties as a series of dynamic measurements based on analyses of the plurality of images.

In some embodiments, determining the one or more physical properties includes analyzing the droplet or the bubble shape based on solving the Laplace equation. In some embodiments, determining the one or more physical properties includes analyzing the droplet or the bubble shape based on polynomial or curve fitting techniques.

In some embodiments, the method includes the step of operating the mobile device to calibrate the image.

According to another aspect of the invention, there is provided a computer program product including a computer readable memory storing computer executable instructions thereon. When such program is executed by a mobile device, the follow steps are performed: operate a camera of the mobile device to obtain an image of a droplet or a bubble; determine one or more physical properties of the droplet or the bubble based on an analysis of the image; and store the one or more determined physical properties on the mobile device or communicate the one or more determined physical properties over a network for storage or review. In some embodiments, the computer executable instructions, when executed by a mobile device, further perform the steps of communicating via a wireless protocol with a structure coupled to a measurement component supporting the droplet or the bubble for positioning the droplet or the bubble relative to the camera or generating or manipulating the droplet or the bubble.

In some embodiments, determining the one or more physical properties includes analyzing the droplet or the bubble shape based on solving the Laplace equation. In some embodiments, determining the one or more physical properties includes analyzing the droplet or the bubble shape based on polynomial or curve fitting techniques.

In some embodiments, communicating the one or more determined physical properties over a network includes communicating over at least one of a local area network or the Internet. In some embodiments, determining one or more surface thermodynamic properties of the droplet or the bubble based on an analysis of the image includes communicating the image to a cloud server and receiving an analytical result based on the image.

In some embodiments, the computer executable instructions that when executed by a mobile device further perform the step of: displaying results of determining the one or more physical properties on a display of the mobile device.

In some embodiments, the computer executable instructions that when executed by a mobile device further perform the steps of: receiving measurements from one or more sensors of the mobile device; and using one or more of the measurements from the one or more sensors in the analysis of the image.

In some embodiments, the computer executable instructions that when executed by a mobile device further perform the steps of: receiving measurements from one or more sensors of the mobile device; and using one or more of the measurements from the one or more sensors in the calibration of the image.

According to another aspect of the invention, there is provided a kit analyzing one or more physical properties of a droplet or a bubble. The kit includes the systems disclosed herein; and at least one or more measurement components.

The details of one or more embodiments are set forth in the description below. Other features and advantages will be apparent from the specification and the claims.

BRIEF DESCRIPTION OF THE DRAWINGS

The foregoing and other aspects of the invention will become more apparent from the following description of specific embodiments thereof and the accompanying drawings which illustrate, by way of example only, the principles of embodiments of the invention. In the drawings:

FIGS. 4A-4D illustrate steps performed by a mobile device application according to an embodiment of the invention;

FIGS. 7A-7D illustrate a system for placement and analysis of a sessile drop, a pendant drop, or a bubble according to an embodiment of the invention in which FIG. 7A is a top view thereof; FIG. 7B is a side perspective view thereof; FIG. 7C is a front view thereof; and FIG. 7D is a side view thereof;

FIGS. 8A-8C illustrate a system for placement and analysis of a sessile drop, the droplet placed through a hole in a surface according to an embodiment of the invention in which FIG. 8A is a front side view thereof; FIG. 8B is a perspective view thereof; and FIG. 8C is a side view thereof;

FIGS. 9A-9D illustrates a system for placement and analysis of a drop on a tilted surface according to an embodiment of the invention in which FIG. 9A is a top view thereof; FIG. 9B is a perspective view thereof; FIG. 9C is a front view thereof; and FIG. 9D is a side view thereof;

FIGS. 10A-10C illustrates a system for placement and analysis of a constrained drop according to an embodiment of the invention in which FIG. 10A is a top view thereof; FIG. 10B is a perspective view thereof; and FIG. 10C is a front view thereof;

FIGS. 11A-11F illustrates a system for placement and analysis of a sessile drop, a pendant drop, or a bubble according to an embodiment of the invention in which FIG. 11A is a front perspective view; FIG. 11B is a top view thereof; FIG. 11C is a back perspective view thereof; FIG. 11D is a front view thereof; FIG. 11E is a side view thereof; and FIG. 11F is a back view thereof;

FIGS. 12A-12F illustrates a system for placement and analysis of a sessile drop according to an embodiment of the invention in which FIG. 12A is a front perspective view; FIG. 12B is a top view thereof; FIG. 12C is a back perspective view thereof; FIG. 12D is a front view thereof; FIG. 12E is a side view thereof; and FIG. 12F is a back view thereof;

FIGS. 13A-13F illustrates a dual-syringe system for placement and analysis of droplets according to an embodiment of the invention in which FIG. 13A is a front perspective view; FIG. 13B is a top view thereof; FIG. 13C is a back perspective view thereof; FIG. 13D is a front view thereof; FIG. 13E is a side view thereof; and FIG. 13F is a back view thereof;

FIGS. 14A-14F illustrates a system for placement and analysis of a constrained drop according to an embodiment of the invention in which FIG. 14A is a front perspective view; FIG. 14B is a top view thereof; FIG. 14C is a back perspective view thereof; FIG. 14D is a front view thereof; FIG. 14E is a side view thereof; and FIG. 14F is a back view thereof;

FIGS. 15A-15F illustrates a system for placement and analysis of a drop on a tilted surface according to an embodiment of the invention in which FIG. 15A is a front perspective view; FIG. 15B is a top view thereof; FIG. 15C is a back perspective view thereof; FIG. 15D is a front view thereof; FIG. 15E is a side view thereof; and FIG. 15F is a back view thereof; and FIGS. 16A-16F illustrate a system for placement and analysis of a bubble within a fluid according to an embodiment of the invention in which FIG. 16A is a front perspective view; FIG. 16B is a top view thereof; FIG. 16C is a back perspective view thereof; FIG. 16D is a front view thereof; FIG. 16E is a side view thereof; and FIG. 16F is a back view thereof.

DETAILED DESCRIPTION OF EMBODIMENTS

Figure 1:
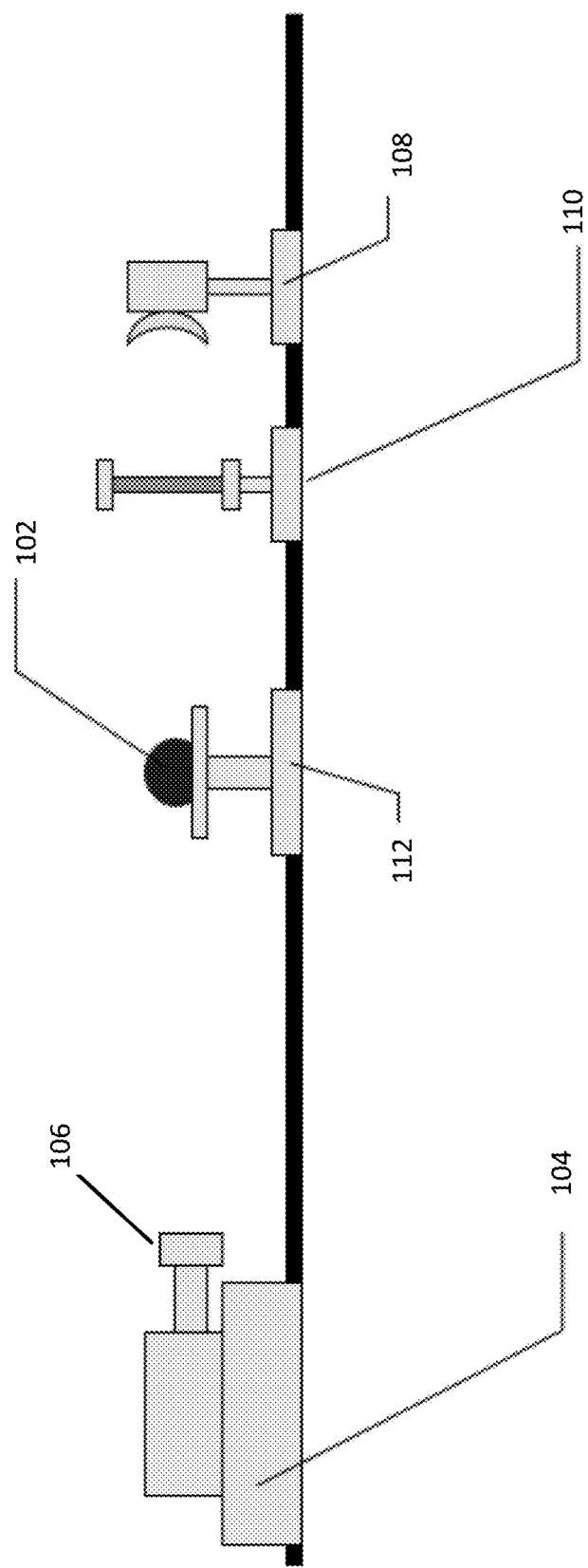
FIG. 1 shows a computerized drop shape analysis system.

The description which follows, and the embodiments described therein, are provided by way of illustration of examples of particular embodiments of the principles of the present invention. These examples are provided for the purposes of explanation, and not limitation, of those principles and of the invention.

Throughout this specification, numerous terms and expressions are used in accordance with their ordinary meanings. Provided below are definitions of some additional terms and expressions that are used in the description that follows:

"Mobile device" includes any mobile devices or apparatuses that is capable of running a programmed application suitable for executing the embodied functionality, including smartphones, tablets, laptops, embedded hardware device, or other mobile computing devices.

"Operating systems" includes any operating system of a mobile device, including Android™, iOS™, Windows™, and Linux™ operating systems.

"Mobile device application" means any programmed software application that operates on a mobile device with an applicable operating system.

"Wireless communication protocol" includes any wireless communication protocols known to a person skilled in the art, including Wi-Fi, Bluetooth, and/or the like.

Two prior systems have attempted to use a smartphone to measure contact angle, but not surface tension, and only with respect to liquids on a solid surface. One iOS application has previously attempted contact angle measurement of a droplet on a surface[21], but is not sufficiently functional to act as a DSA system. It has a crude image processing, and uses a defunct geometrical principle to find the contact angle, and does not solve the Laplace equation. This iOS application is not able to achieve the functionality of the disclosed technology. Another prior system[22], uses a smartphone as a camera with a macro lens attachment to take an image of a droplet, but the mobile device does not perform any analysis. None of such system had a purpose designed system/hardware as described herein.

Disclosed herein is a novel and cost-efficient tool, with embodiments including systems, methods, kits, and computer program products, for using a mobile device to measure physical properties of droplets or bubbles or surfaces. In some embodiments, the mobile device is a smartphone or a tablet, for example smartphones and tablets running the Android™ and iOS™ operating systems.

The disclosed technology may, in some embodiments, be competitive in pricing compared to traditional DSA systems since there is no need for an external camera, lens, or an additional standalone computer, etc., since it is based on a mobile device. The latter point together with compactness of the hardware accessories make it portable, so it can be used for work in the lab or field. Some aspects of both price and portability are improved compared to some previously available instruments. Further, the ability of the disclosed technology to provide for an integrated connectivity with the Internet may allow for better document management and recordkeeping (e.g., by depositing or pulling information or results onto or from cloud based services, emailing, and remote review of results), use of social media, and collection and managing profiles of users of the technology.

Figure 2B:
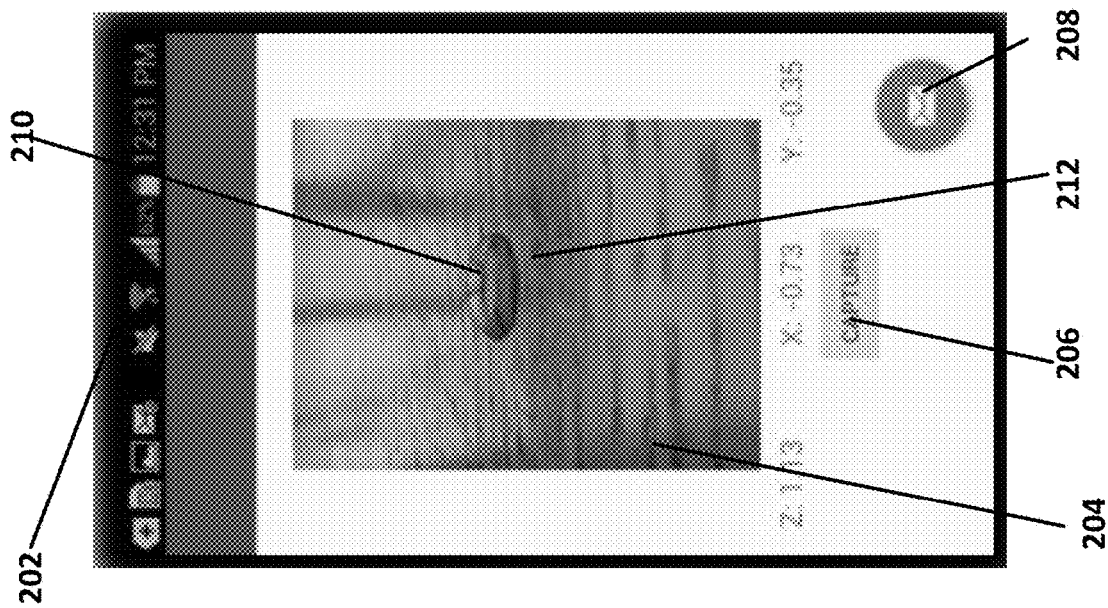
FIGS. 2A-2C and 2E-2J depict exemplary mobile device applications for measurement of physical properties according to an embodiment of the invention.
Figure 2A:
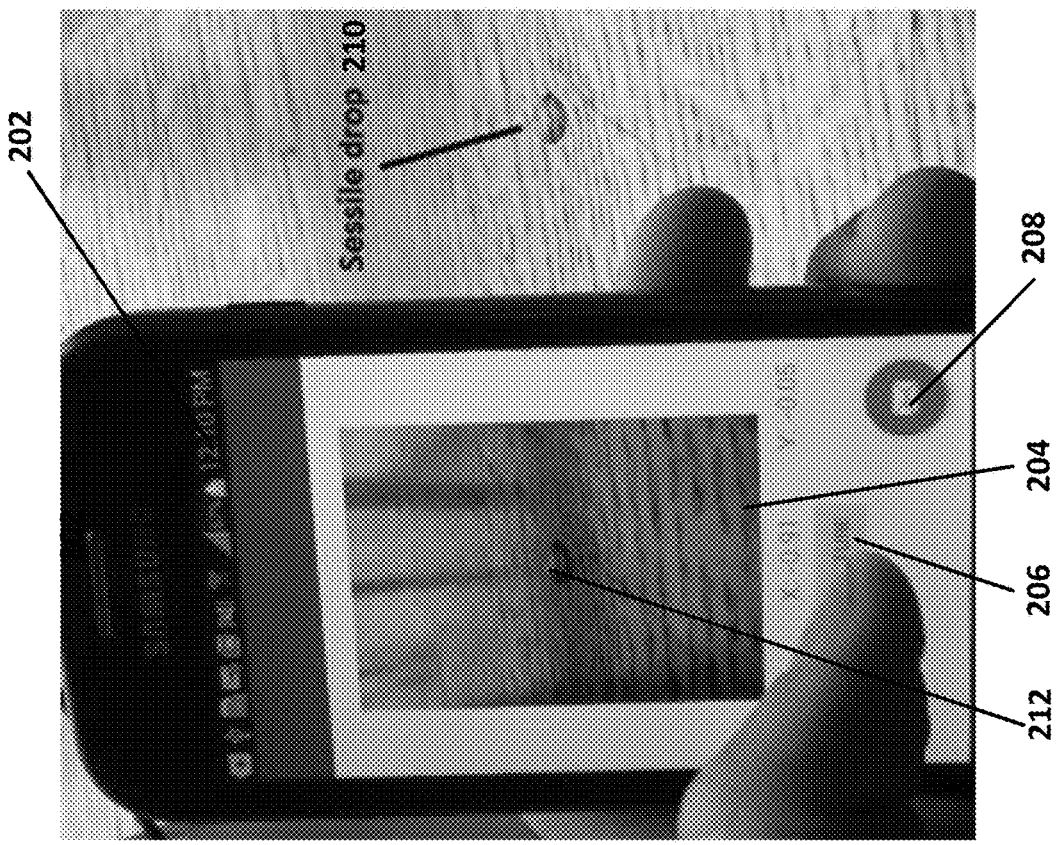
Figure 2F:
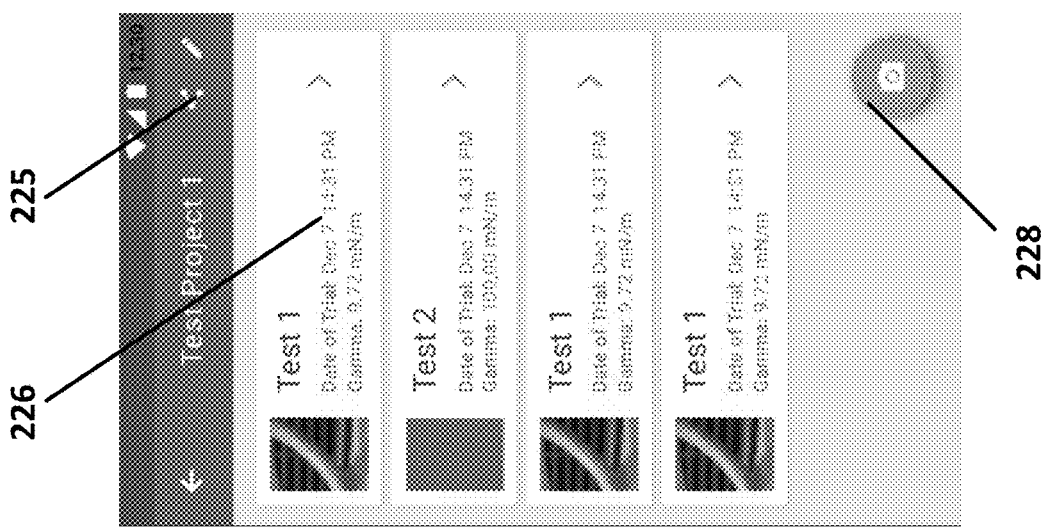

FIGS. 2A and 2B depict the operation of a mobile device application for measurement of physical properties according to an embodiment of the invention. In FIG. 2A, a mobile device application is shown executing on mobile device 202. The mobile device 202 is oriented by a user so that a sessile droplet 210 on a flat surface is located within the field of view of the mobile device's camera (not shown). An image 204 of the field of view of the camera is shown on the display of the mobile device 202, including an image 212 of the sessile drop 210. In some embodiments, image 204 may consist of a continuously updated video image derived from the mobile device's camera. In some embodiments, image 204 may consist of a periodically updating series of still images derived from the mobile device's camera.

A "capture" button 206 is also shown on the display of mobile device 202. When pressed by a user, the mobile device application captures a still image from the camera and performs an analysis of the still image to determine one or more physical properties of droplet 210 as described further below. Although FIGS. 2A and 2B depict a sessile droplet 210 on a flat surface, it should be understood that embodiments of the mobile device application may be configured to determine physical properties of pendant droplets, constrained sessile droplets, droplets on tilted surfaces, droplets within immiscible fluids, and/or bubbles within fluids as described further below. An "e-mail" button 208 is also shown on the display of mobile device 202 When pressed by a user, the mobile device application communicates a still image from the camera via e-mail. It should be understood that the particular user interface illustrated in FIGS. 2A and 2B is provided as an example, and that other user interfaces understood in the art are contemplated.

While the embodiment illustrated in FIGS. 2A and 2B uses e-mail, in other embodiments, the mobile device application can communicate a still image, a series of images, calculations, characteristics of the droplet 210, or a combination of any of the foregoing wirelessly to other computing devices, using wireless communication protocols, including by Wi-Fi, Bluetooth, and the like, through the mobile application. In some embodiments, the still image, series of images, calculations, characteristics of the droplet 210, or a combination of any of the foregoing can be communicated to a server on the cloud and stored on the cloud server. In some embodiments, the mobile device application on mobile device 202 may have functionality to capture multiple images, including over a pre-determined period of time, a time period set by the user, or a combination of the foregoing. In some embodiments, the mobile device application on mobile device 202 has functionality to apply image filters known to a person skilled in the art to images captured by the mobile device 202. In some embodiments, these functionalities are activated by on-screen buttons. In some embodiments, the mobile device application on mobile device 202 provides a "calibrate" button to active calibration functionality of the mobile device application.

Figure 2E:
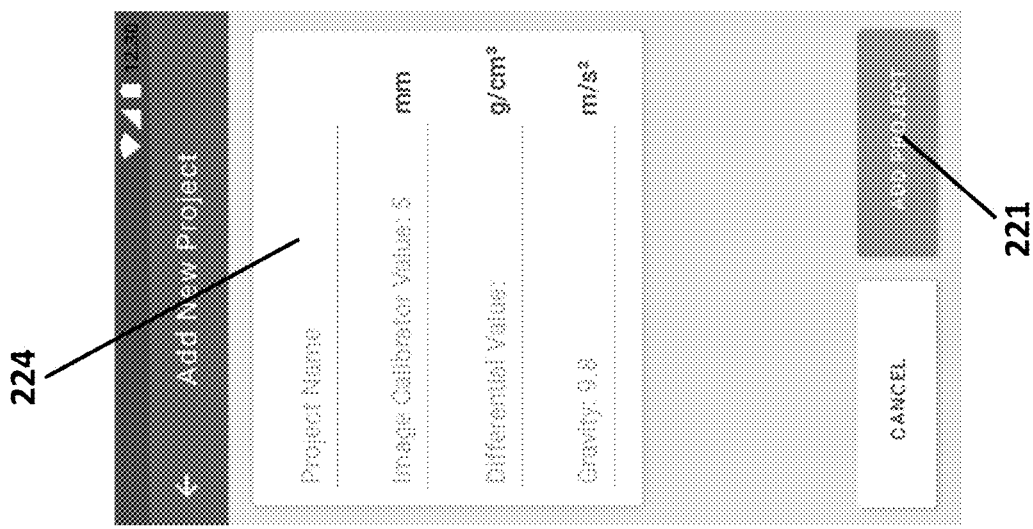
Figure 2C:

FIGS. 2C and 2E-2I depict the operation of a mobile device application for measurement of physical properties of a droplet or a bubble according to another embodiment of the invention. In this embodiment, the mobile device application has a project management interface to allow a user to save information from different tests conducted using the mobile device applications and categorize them by projects. As shown in FIG. 2C, mobile device application has a "+" button 220 that allows new projects to be added and saved projects can be accessed through button 222. When a user presses button 220, the mobile application proceeds to the screen shown in FIG. 2E. In this embodiment, the name of the project can be entered by the user, as well as image calibration value, density differential value, gravity, acceleration, and the like or a combination of any of the foregoing. Other data inputs known to a person skilled in the art may also be added. Once a project has been added by pressing the "add project" button 221, the user is led to the screen illustrated in FIG. 2F. In this embodiment, the results of different tests can be accessed by pressing buttons 226. To capture new images, the camera button 228 can be selected. The "share" button 225 allows the results of the project or individual results to be shared using the device's sharing functionalities, including to specific individuals on a contact list, email, cloud server, and the like.

Figure 2I:
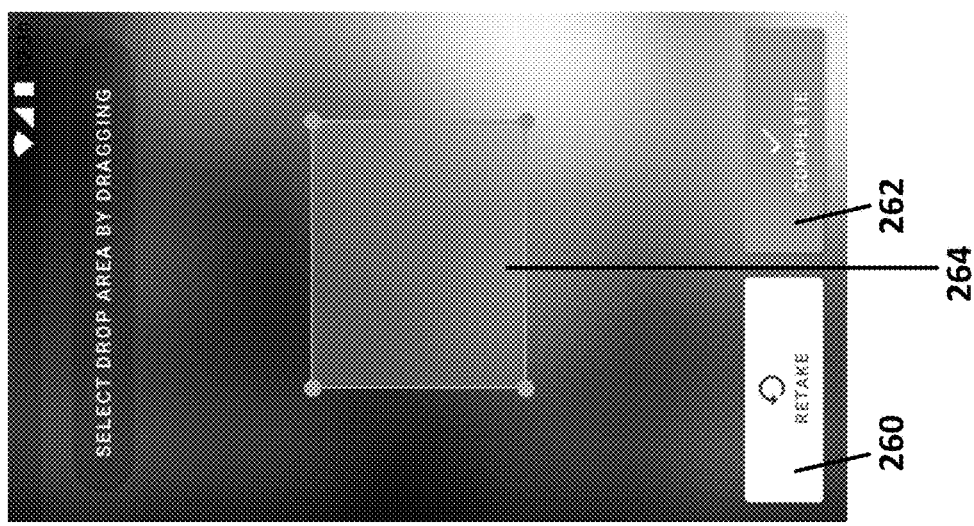
Figure 2H:
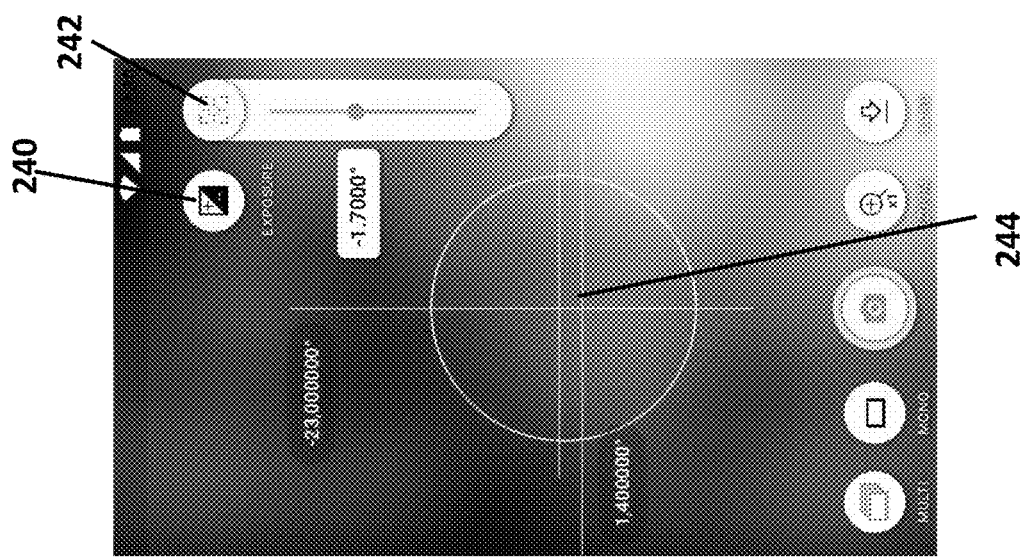
Figure 2G:
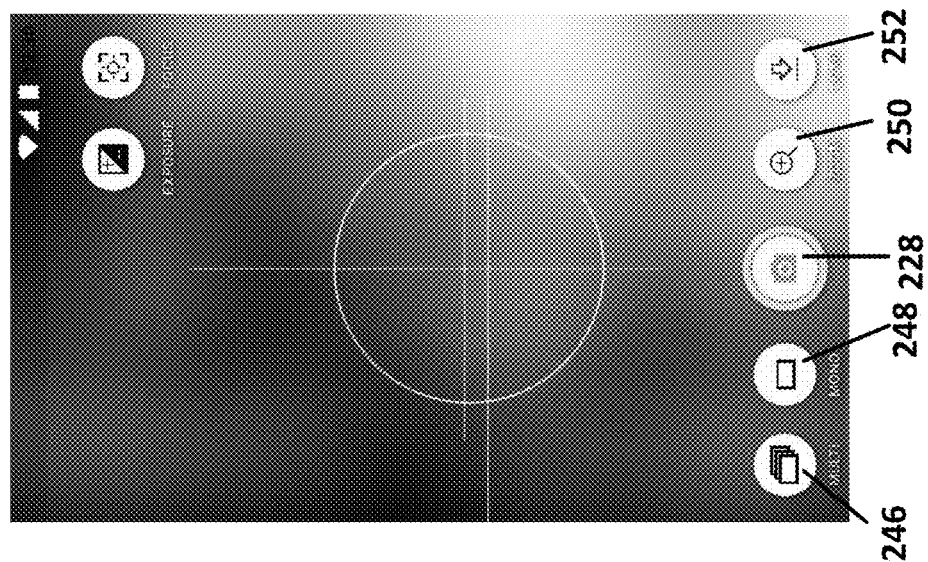

Upon a user selecting the capture button 228, the user is led to the image capture screen illustrated in FIG. 2G. In this embodiment, the image capture screen includes various functionalities. The "exposure" button 240 allows adjustments of the exposure level for the image to be captured by the mobile device's camera. The "focus" button 242 allows an image to be brought manually into focus by the camera of the mobile device. In some embodiments, the mobile device application by default uses an auto focus function. The "multi" button 246 allows multiple images to be captured by the mobile device's camera in predefined number or intervals. The "mono" button 248 allows a single image to be captured by the mobile device's camera. To capture the image, the "camera" button 228 can be selected. The "zoom" button 250 allows the zoom level of the camera to be adjusted. In some embodiments, the mobile device application by default uses the maximum zoom available for a particular mobile device. In some embodiments, the maximum zoom is the maximum digital zoom available for a mobile device. In some embodiments, the maximum zoom is the maximum optical zoom available for a mobile device. The "load" button 252 allows pictures previously captured to be loaded into the mobile device application. In this embodiment, the mobile device application provides a crosshair to ensure the mobile device is in the proper orientation for capturing the images. FIG. 2H illustrates an on-screen slider interface for adjusting focus using the "focus" button 242.

Once an image has been captured using the camera button 228, the user is led to the selection screen illustrated in FIG. 2I. In this embodiment, the selection screen includes a touch interface that allows the drop area 264 to be selected by dragging on the touch screen of the mobile device. If the image is not satisfactory, then the user can press the "retake" button 268 to go back to the image capture screen illustrated in FIGS. 2G and 2H. If the image is satisfactory, then the user can press the "complete" button 262.

In some embodiments, the images captured by the mobile device using the mobile device application can be calibrated. The calibration can use information about the droplet generator or the bubble generator. In some embodiments, calibration of the captured image is done using a calibration target. In one embodiment, the generator of the bubble or droplet is a needle, and the calibration target is the needle. In the illustrated embodiment, the diameter of the needle is added as an input (e.g., as shown in FIG. 2E). The mobile device application then receives information from the processor on how many pixels the device's camera has. The mobile device application allows placement of a line on the top of the needle (or a calibration target) and approximates the location of the outline of the needle (or the calibration target). Through image processing by the processor, the mobile device application can find the true location of the needle (or the calibration target) and find how many pixels it measures across. By comparing the physical size of the needle and the number of pixels in the captured image, calibration of the image can be performed. The calibration result can allow the physical size of the droplet or the bubble to be determined. Determination of the physical size of the droplet or the bubble allows a unique solution for Laplace equation to be found based on the physical dimensions of the droplet or bubble. The physical size of the droplet or the bubble can also be used by the mobile device application to calculate the value of the volume, surface area, and apex curvature of the droplet or bubble.

Figure 2J:
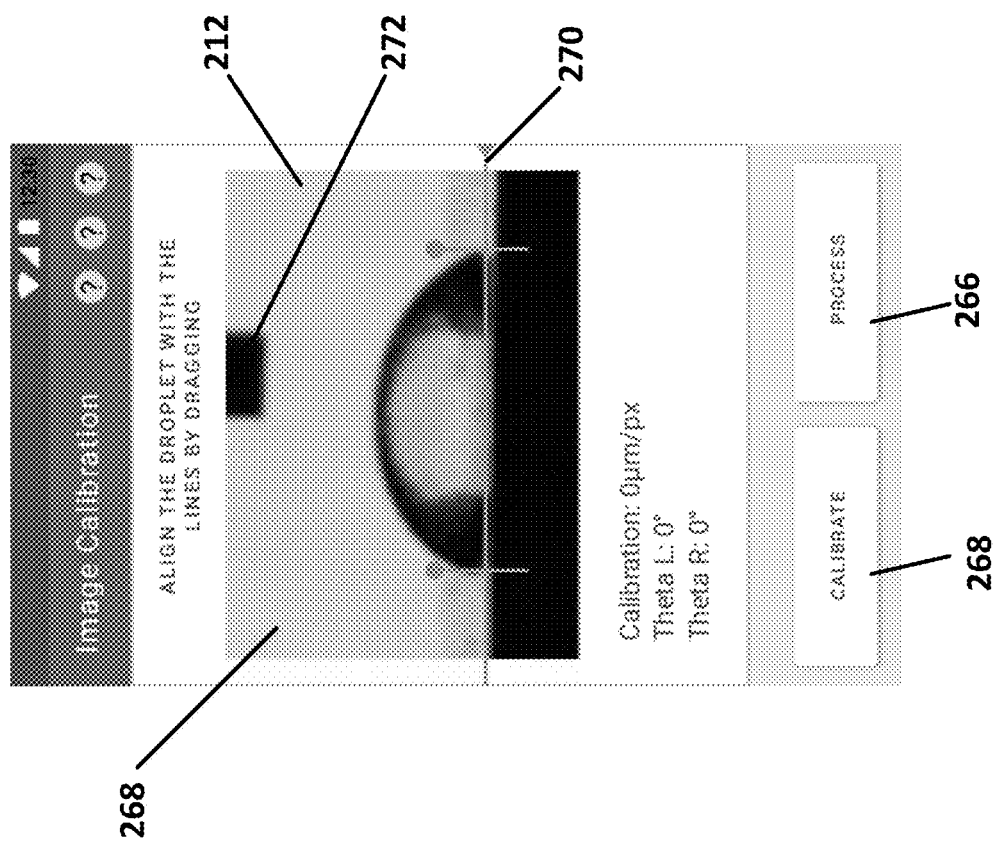

FIG. 2J illustrates an embodiment of the mobile device application having the calibration functionality. In this embodiment, the user can place a line on the top of the needle 272 by dragging line 270 using on screen controls. Once the alignment is done by the user, the user can press the "calibrate" button 268 to calibrate the image captured by the mobile device's camera and calibration as discussed in the foregoing can take place. Once calibration has been performed, the user can select the "process" button 266 to process the captured image.

While the embodiments illustrated in FIGS. 2A-2J are shown to analyze droplets, the same or other embodiments may also be used to analyze bubbles.

FIGS. 3A through 3D depict apparatuses for measurement of physical properties using a mobile device according to embodiments of the invention.

Figure 3A:
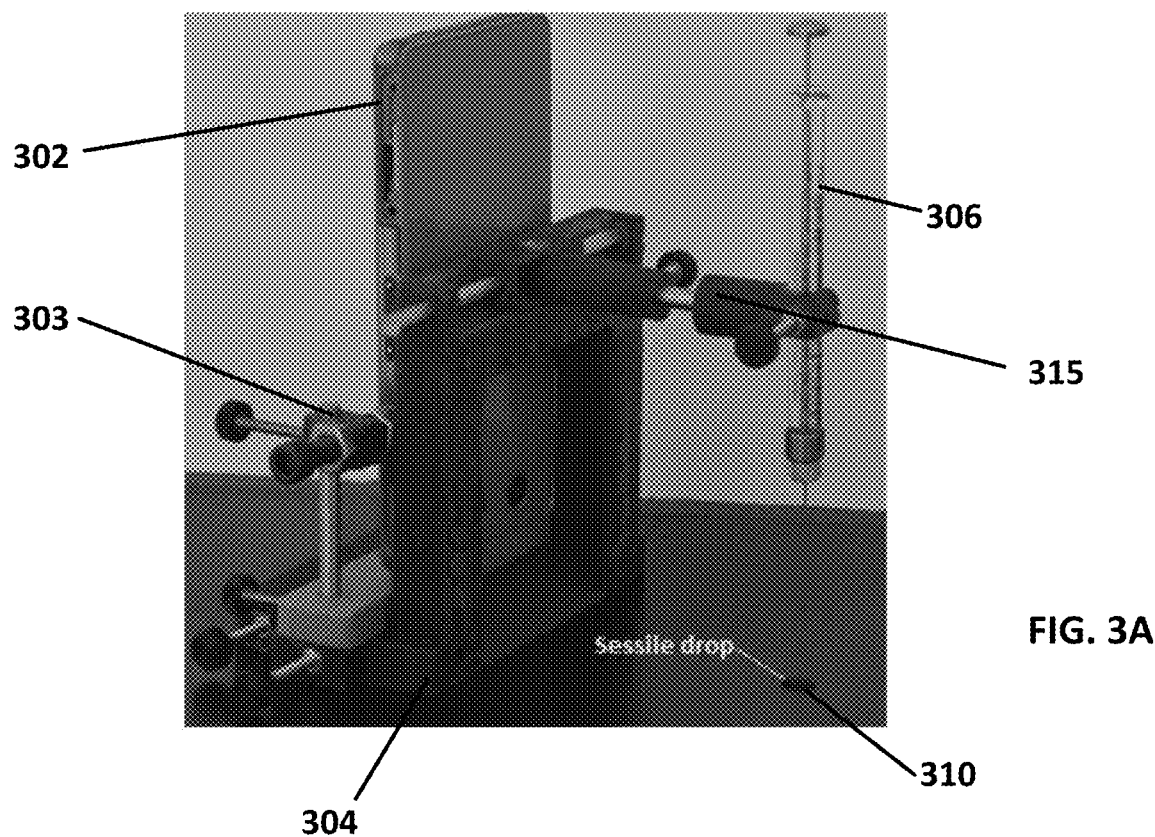
FIGS. 3A-3D depict apparatuses for measurement of physical properties using a mobile device according to embodiments of the invention.

In FIG. 3A, a mobile device 302 is shown having been received and held upright by a support 303. A structure 304 is coupled to the support 303 that is adapted to removably receive measurement components. It should be understood, however, that in some embodiments measurement components may be permanently affixed to, or otherwise integrated in a non-removable configuration with, structure 304. In the example shown in FIG. 3A, a measurement component 315 for analyzing sessile droplets has been attached to structure 304. The illustrated measurement component 315 holds a syringe 306 operable to place a sessile drop 310 on a horizontal surface within view of the camera of mobile device 302. Syringe 306 may also be used to deposit a drop of fluid within an immiscible fluid, for example an immiscible fluid held in a beaker placed under syringe 306, or to inject a bubble within a fluid.

Figure 3B:
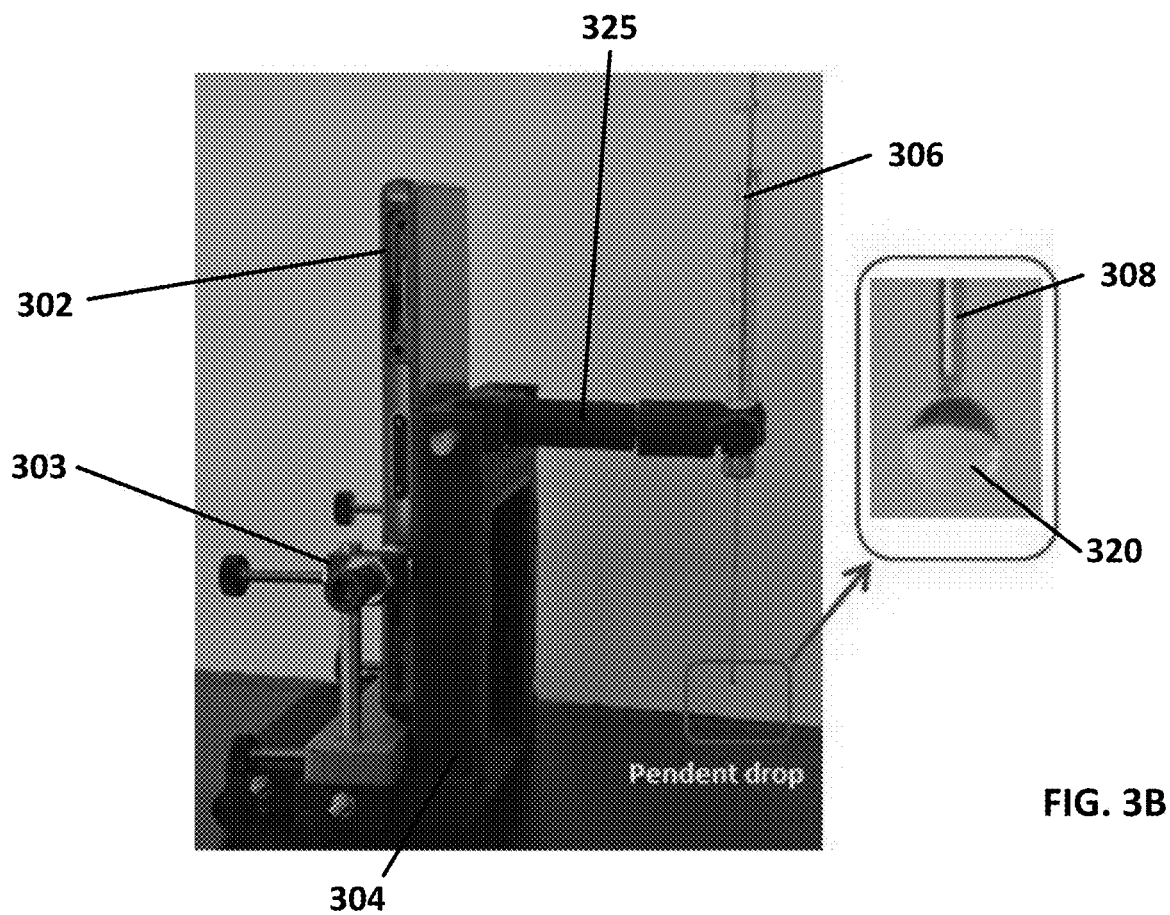

FIG. 3B depicts a variant of the system of FIG. 3A, in which a measurement component 325 for analyzing pendant droplets has been attached to structure 304. The illustrated measurement component 325 holds a syringe 306 with a needle 308 operable to suspend a droplet 320 of fluid within view of the camera of mobile device 302.

Figure 3D:
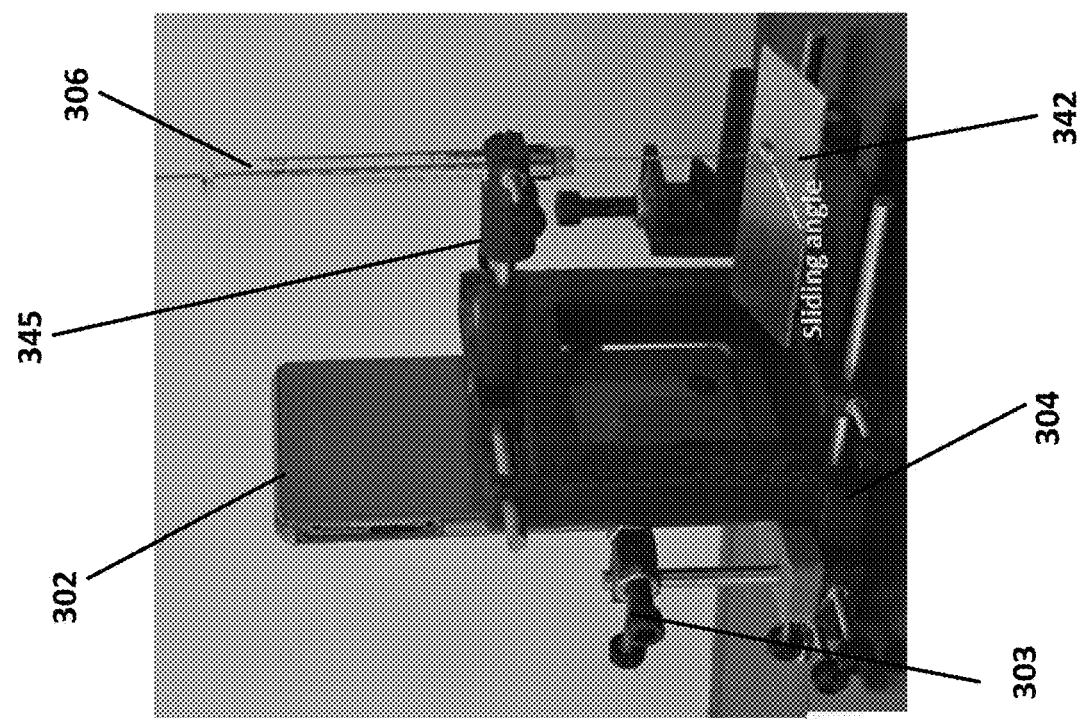
Figure 3C:
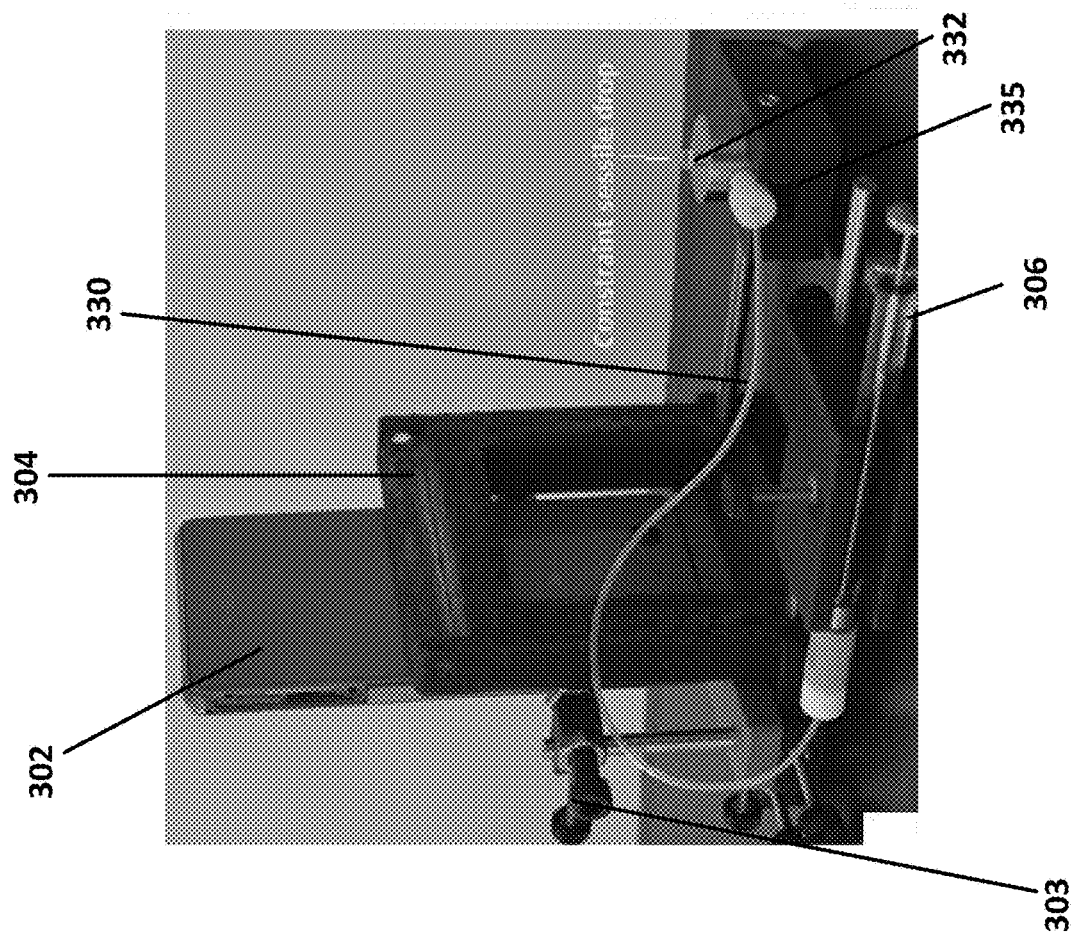

FIG. 3C depicts another variant of the system of FIG. 3A, in which a measurement component 335 for analyzing constrained sessile drops has been attached to structure 304. Measurement component 335 includes a pedestal 332 having an internal passage in fluid communication with a syringe 306 via a flexible conduit 330. Syringe 306 is operable to deposit a drop of fluid on top of the wide cross section of an inverted frustum portion of the pedestal 332 so that the droplet is constrained on top of the inverted frustum portion of the pedestal 332.

FIG. 3D depicts another variant of the system of FIG. 3A, in which a measurement component 345 for analyzing liquid drops on tilted surfaces has been attached to structure 304. In this embodiment, measurement component 345 includes a platform 342 whose angle is adjustable around an axis perpendicular to the body of mobile device 302, and a syringe 306 for depositing a drop of fluid on the platform 342.

FIGS. 4A through 4D illustrate some of the steps performed by a mobile device application according to an embodiment of the invention. In this embodiment, the mobile device application 400 is an application operating on the Android platform. In other embodiments, mobile device application 400 can operate on other operating systems. As illustrated in FIG. 4A, an image of the pendant droplet 410 has been captured by the mobile device application 400 using the onboard camera of the mobile device. The processor of the mobile device instructs the display to show the image of the pendant droplet 410 within the mobile device application 400. In FIG. 4B, the processor of the mobile device, executing instructions from the mobile device application 400, measures the detected edge 412 of the pendant droplet 410 using image analysis algorithms known to a person skilled in the art and instructs the display to show the detected edge 412. In some embodiments, the processor of the mobile device, executing instructions from the mobile device application 400, applies image filtering processes known to a person skilled in the art to prepare the image for detection of the detected edge 412.

In FIG. 4C, the processor of the mobile device, executing instructions from the mobile device application 400, calculates a solution 414 of the Laplace equation for the pendant droplet 410 (based on characteristics of the pendant droplet 410 as measured from the image of the pendant droplet 410) and compares the calculated solution 414 with the detected edge 412 of the pendant droplet 410. The processor then instructs the display to illustrate the detected edge 412 and the solution from the Laplace equation 414. In this embodiment, the solution 414 is shown on the display overlapping the detected edge 412. In other embodiments, the solution 414 can be compared with the detected edge 412 in numerical form. In other embodiments, the solution 414 can be compared with the detected edge 412 using other methods known to a person skilled in the art. In FIG. 4D, the processor of the mobile device, executing instructions from the mobile device application 400, matches the detected edge 412 with the solution 414 to calculate the surface tension 420 of the pendant droplet 410. The processor then instructs the display to show the value of surface tension 420 on the top left of the mobile device application 400. In other embodiments, the value of the surface tension 420 can be displayed in any other manner on the display of the mobile device operating the mobile device application 400. In some embodiments, the mobile device application 400 calculates and displays other characteristics of the pendant droplet 410 using algorithms and formulae known to a person skilled in the art.

In one embodiment, the mobile device application 400 contains instructions with the following exemplary pseudocode:

```
Find left point on the photo taking the closest possible profile pixel using area left point
Find right point on the photo taking the closest possible profile pixel using area right point
WHILE left point IS NOT null && right point IS NOT null
   SET last pixel TO left point
   ADD last pixel TO list of pixels
   WHILE true
      IF last pixel IS null
         break
      ELSE IF last pixel IS right point
         ADD list of pixels TO list of possible profiles
         break
      ELSE
         Find new last pixel using the next possible pixel of the profile
         tracking from last pixel using color value
         ADD last pixel TO list pixels
      END
   END
   Find next possible left point on the photo the closest possible profile point
   Find next possible right point on the photo the closest possible profile point
END
IF size of list of possible profiles < 1
   EXCEPTION profile not found
ELSE IF size of list of possible profiles == 1
   SET profile TO list of possible profiles AT POSITION 0
ELSE IF size of list of possible profiles == 2
   SET profile TO list of possible profiles AT POSITION 1
ELSE
   Get an intermedium profile from list of possible profiles
END
Calculate results using the profile with DSA
IF pendant drop
   Calculate capillar angle
   Correct results using gyro x, gyro y, gyro z, capillary angle
ELSE
   Correct results using gyro x, gyro y, gyro z
END
Save results
IF automatic IS false
   PRINT results
END
Allow phone enter on power save mode
```

In some embodiments, such as the embodiment of the mobile device application having the pseudocode illustrated above, the mobile device application uses sensors of the mobile device such as the gyroscope, magnetometer, and the like, to correct the orientation of the detected profile or edge of the droplet or bubble relative to the normal as may be needed. In some embodiments, the mobile device application automatically corrects the image based on input from the sensors of the mobile device, such as those as described herein.

Figure 5:
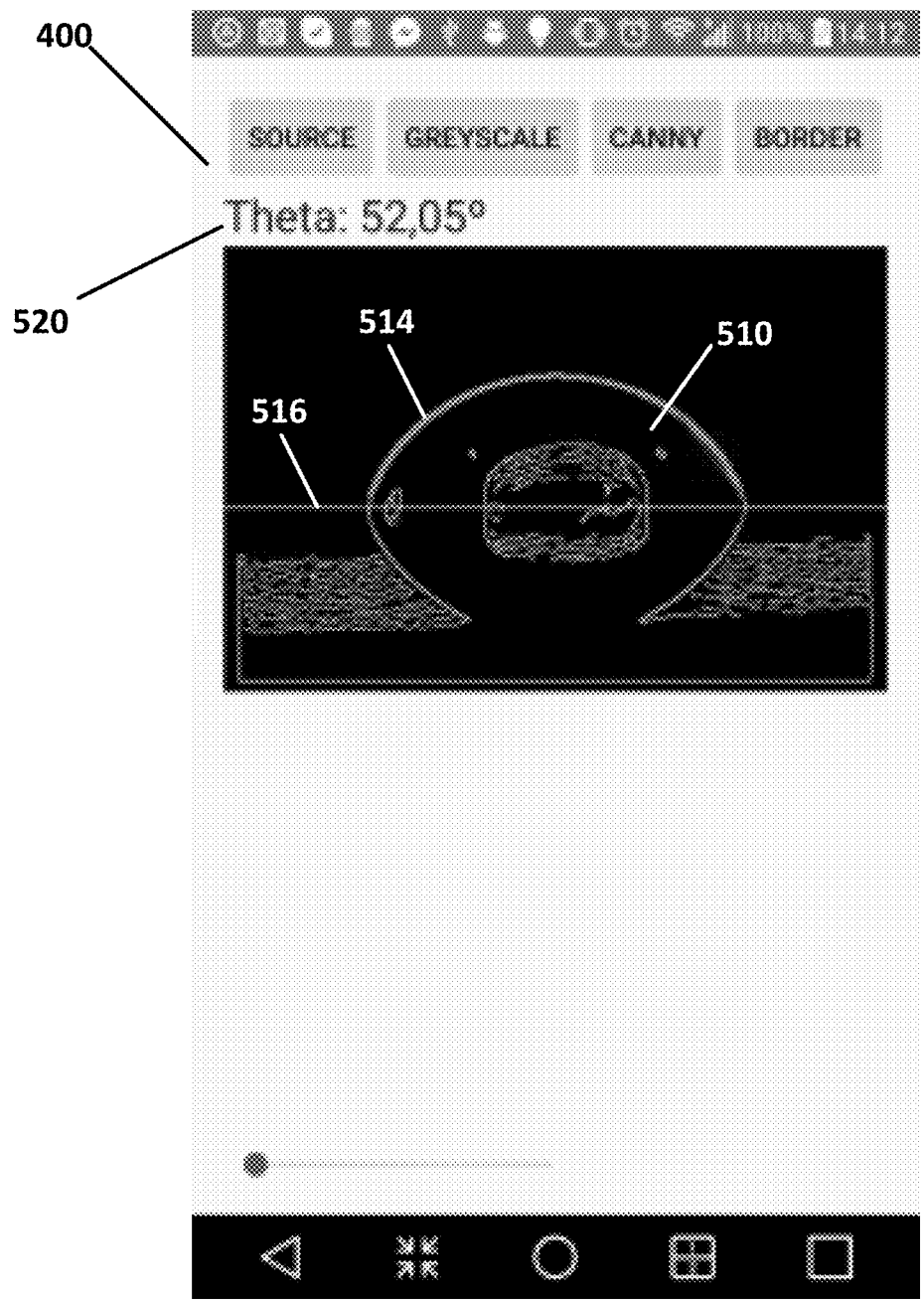
FIG. 5 illustrates an on-screen analytical result from a mobile device application according to an embodiment of the invention.

FIG. 5 illustrates an on-screen analytical result from a mobile device application according to an embodiment of the invention. In this embodiment, the mobile device application 400 is used to analyze a sessile droplet 510 on surface 516. Similar to the embodiment illustrated in FIG. 4, an image of the sessile droplet 510 has been captured by the mobile device application 400 using the onboard camera of the mobile device. The processor of the mobile device instructs the display to show the processed image of the sessile droplet 510 within the mobile device application 400. The processor of the mobile device, executing instructions from the mobile device application 400, calculates a solution 514 of the Laplace equation for the sessile droplet 510 (based on characteristics of the sessile droplet 510 as measured from the image of the sessile droplet 510) and compares the calculated solution 514 with the detected edge of the sessile droplet 510. In FIG. 5, the solution 514 is shown on the display overlapping the detected edge. The processor of the mobile device, executing instructions from the mobile device application 400, then matches the detected edge with the solution 514 to calculate the contact angle 520 of the sessile droplet 510. The processor then instructs the display to show the value of contact angle 520 on the top left of the mobile device application 400. In other embodiments, the value of the contact angle 520 can be displayed in any other manner on the display of the mobile device operating the mobile device application 400. In this embodiment, the mobile device application 400 calculates and displays the contact angle 520 of the sessile droplet. In other embodiments, the mobile device application 400 calculates and displays other characteristics of the sessile droplet 510 using algorithms and formulae known to a person skilled in the art. In some embodiments, the mobile device application 400 can be used to measure the wettability of a solid surface by a liquid or to calculate solid surface energy.

In some embodiments, the mobile device application 400 receives information from the gyroscopic (orientation) sensor from the mobile device to prevent images from being captured by the mobile device when the mobile device is not in the appropriate orientation to avoid the resultant perspective errors during imaging. In some embodiments, information from the gyroscopic sensor can be used for correcting the orientation of detected profile or edge of the droplet or bubble relative to the normal as may be needed.

While the embodiments illustrated in FIGS. 2, 4, and 5 displays the resulting calculations, such as the surface tension, contact angle, solid surface energy, and/or the like on the display of the mobile device, such calculations can be transmitted for display on another display, such as a television, monitor, and the like using wireless display methodologies known to a person skilled in the art. In some embodiments, the mobile device communicates with a display wirelessly using the Miracast standard. In some embodiments, such calculations can be transmitted to a third party device using communication protocols known to a person skilled in the art.

In some embodiments, the processor on the mobile device performs instructions from the mobile device application 400 to analyze and calculate physical properties of the droplets. In some embodiments, the mobile device application 400 can issue instructions to the processor of the mobile device to transmit the data to a server (including a cloud server) where data processing can take place. The results of the processing can then be communicated to the mobile device or other devices.

In some embodiments, the mobile device application 400 provides profile functionalities where a user can sign up for an account and all project information, including all tests conducted, may be uploaded and remotely stored on a server (including a cloud server, private server, or the like). Once the user log into the account, the mobile device application 400 will automatically download all information on tests conducted using the mobile device application. In some embodiments, content is deployed to the mobile device application 400 by a server based on information associated with a profile, such as testing data, usage pattern, analytical data, and the like. In some embodiments, testing data, usage pattern, analytical data, and the like can be collected without the need of signing into an account.

In some embodiments, location information (as determined using the GPS, assisted-GPS system of the mobile device, and the like) is communicated to the server, and information communicated by the server to user of the mobile device application can be adapted based on the location information. In some embodiment, location information is determined using the IP addresses of the mobile device.

In some embodiments, the mobile device application 400 contains advertisements deployed by an ad server based on the measurements or user profile analytics done by a cloud server. In some embodiments, the mobile device application 400 provides a user with established data, information, or tutorials based on the measurements or analytics done by the cloud server or the mobile device application 400 or at the request of the user.

In some embodiments, physical properties measured by mobile device application 400 include interfacial tension, contact angle, advancing contact angle, receding contact angle, solid surface energy, sliding angle, droplet or bubble volume, bubble or droplet surface area, or a combination of any of the foregoing.

In some embodiments, the mobile device application 400 contains instructions for instructing the processor to activate the maximum zoom of the camera on the mobile device to enhance the accuracy of the measurements. In some embodiments, the maximum zoom is the maximum optical zoom. In some embodiments, the maximum zoom is the maximum digital zoom. In some embodiments, the mobile device application 400 contains instructions to the processor to activate an appropriate zoom of the camera that is particular to a mobile device to enhance the accuracy of the measurements.

In some embodiments, the mobile device application 400 can be used for remote or nearby continuous monitoring through streaming of data via wireless and wired connections, including Wi-Fi, cellular network, cable, or Bluetooth, other wireless communication protocol, and the like.

In some embodiments, the mobile device application 400 utilizes the largest resolution possible from the mobile device's camera and then adapts the image processing scheme based on the types of imaging sensors on different mobile devices.

In some embodiments, the mobile device application 400 may contain instructions to communicate and control other devices, such as the droplet or bubble injection device. In some embodiments, the mobile device application 400 receives information from other sensors of the mobile device or other sensors communicating with the mobile device, such as humidity sensors, temperature sensors, pressure sensors, and/or the like.

While the embodiments illustrated herein use the Laplace equation to calculate the physical properties, in some embodiments, other methodologies can be used, such as polynomial or curve fitting techniques or the like.

Figure 6:
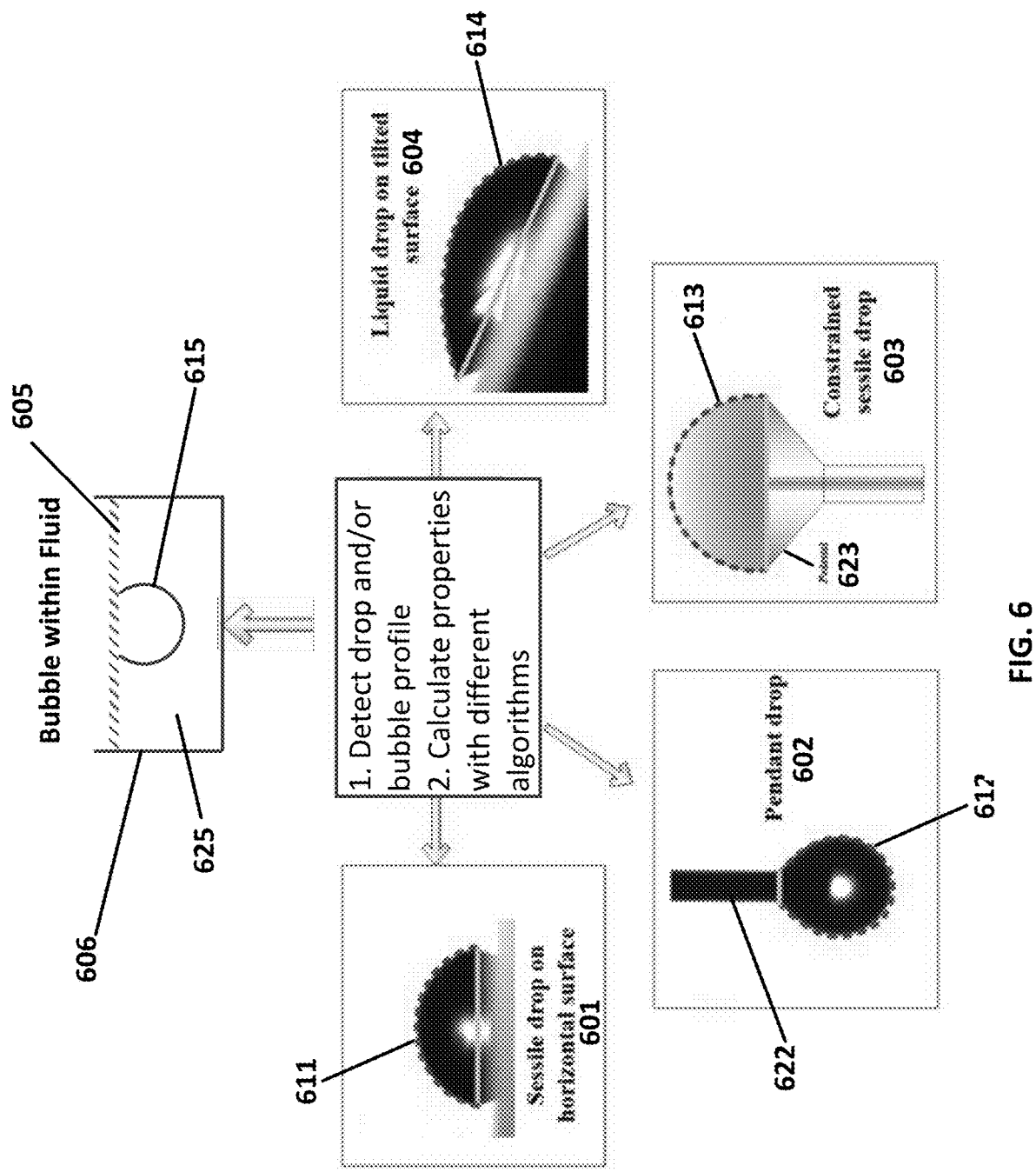
FIG. 6 illustrates example configurations of drops and bubbles for analysis by embodiments of the invention.
Figure 7A:
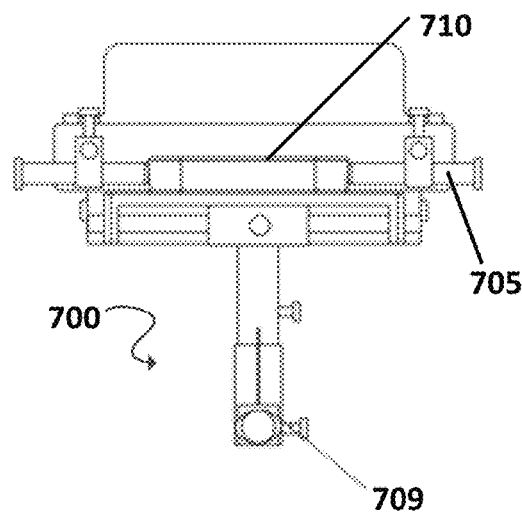
Figure 7B:
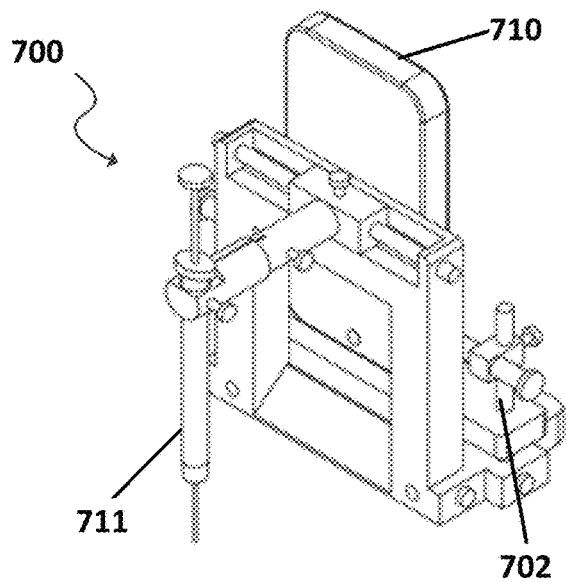
Figure 7C:
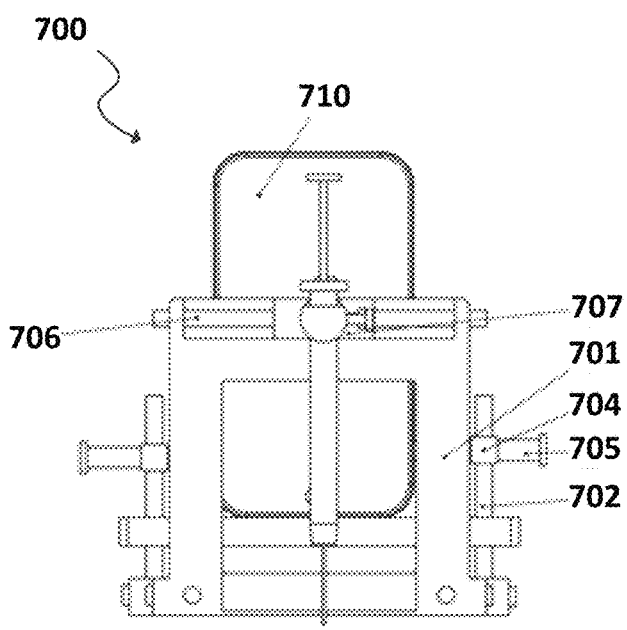
Figure 7D:
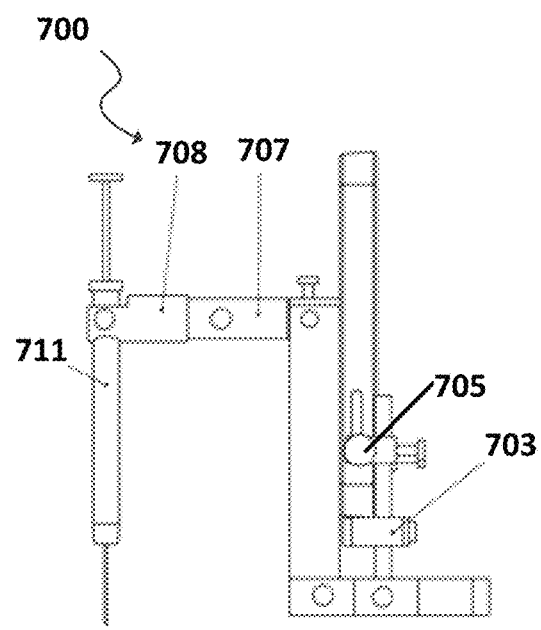
Figure 9A:
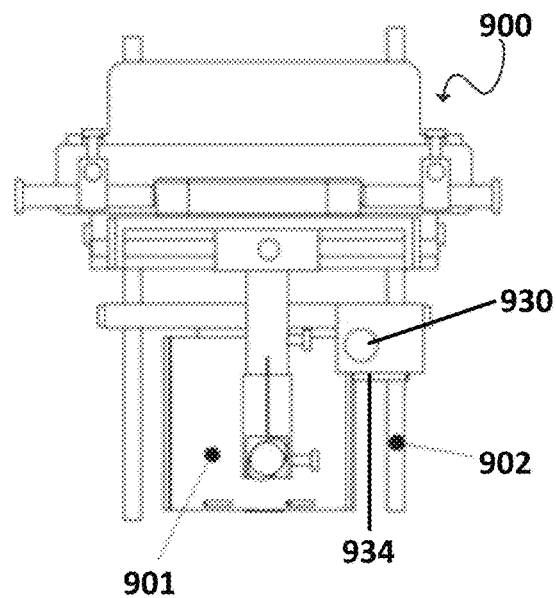
Figure 9B:
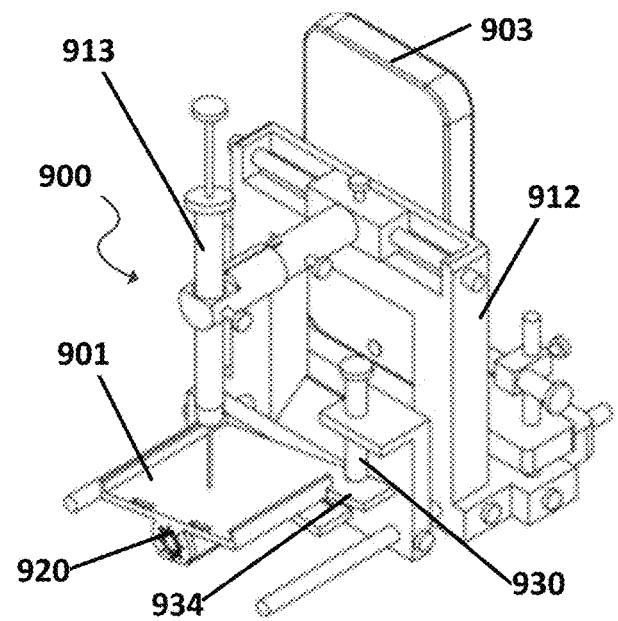
Figure 9C:
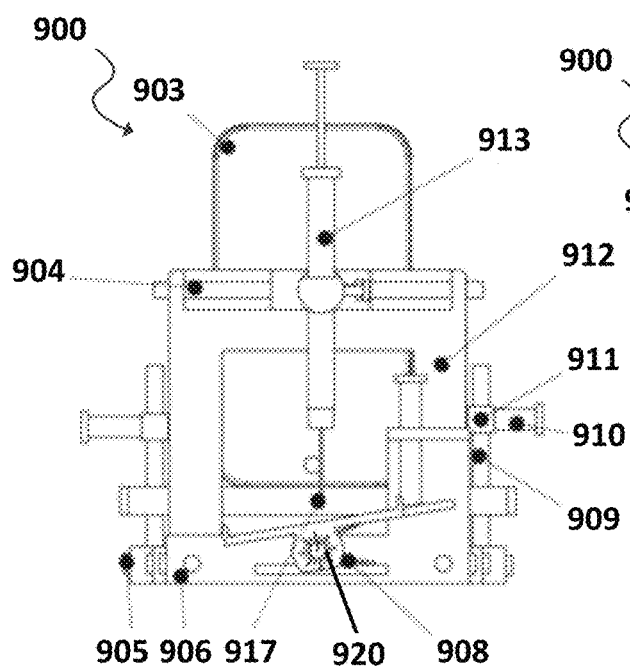
Figure 9D:
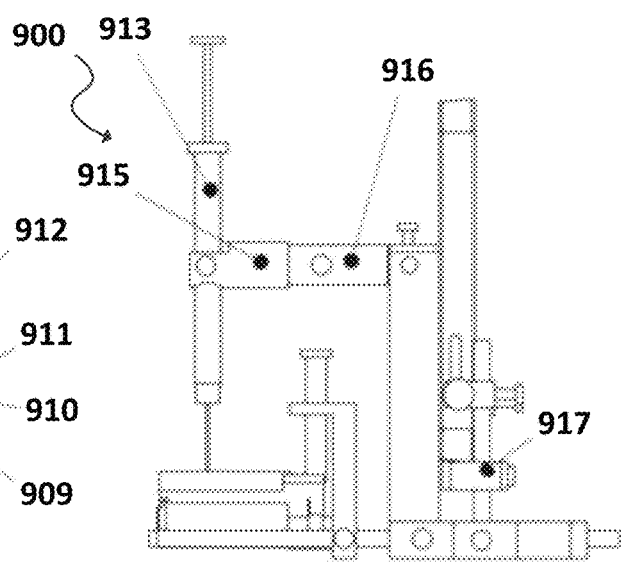

FIG. 6 illustrates example configurations of drops and bubbles for analysis by embodiments of the invention. In some embodiments, the systems and methods disclosed herein can be used to measure characteristics of a sessile drop 611 on a horizontal surface 601. In some embodiments, the systems and methods disclosed herein can be used to measure characteristics of a pendent drop 602 having exterior surface 612 exiting needle 622. In some embodiments, the systems and methods disclosed herein can be used to measure characteristics of a constrained sessile drop 603 having exterior surface 613 supported by a pedestal (drop holder) 623. In some embodiments, the systems and methods disclosed herein can be used to measure characteristics of a liquid drop on a tilted surface 604 having exterior surface 614. In some embodiments, the systems and methods disclosed herein can be used to measure characteristics of a bubble 615 resting against a solid 605 within a fluid 625 in a container 606. In some embodiments, the systems and methods can be used to measure one or more of the foregoing physical properties for liquids or solutions or solid surface or any combination thereof.

A mobile device running the mobile device application 400 can be used as part of different systems for measurement of physical characteristics and properties of a droplet or a bubble. The system includes removably couplable structures, such as measurement components, that are modular in nature and can be swapped in and out depending on the requirements of the users. Some of these systems are described below.

FIGS. 7A-7D illustrates an example system 700 for placement and analysis of a sessile drop, a pendant drop, a drop suspended in an immiscible fluid, or a bubble suspended in a fluid according to an embodiment of the invention. A mobile device 710 is placed on a support platform 703 coupled to a support structure 701. The mobile device 710 is held in place on the platform by an adjustable clamping mechanism 705. The height of the platform 703 is adjustable by a sliding mechanism 704 supported by rods 702.

The support structure 701 includes a horizontal rod 706 along which is mounted an arm 707, the arm 707 having a syringe-holding extension 708 for supporting a syringe 711. The height of syringe 711 within the syringe-holding extension 708 is adjustable, with the syringe being fixable in place at a given height by thumb screw 709. The syringe-holding extension 708 is movable outwards from the support structure 701 along the length of arm 707 to adjust the distance of the syringe from the camera. Syringe 711 may be operated to place a sessile drop on a horizontal surface within view of the camera of mobile device 710. Alternatively, syringe 711 may also be operated to generate a pendant drop from the syringe, or to deposit or to hold a drop of fluid within an immiscible fluid, for example an immiscible fluid held in a beaker placed under syringe, or to inject a bubble within a fluid. In an example application, the system illustrated in FIG. 7 may be placed inside an environmental chamber in order to control atmospheric and environmental parameters.

FIGS. 8A-8C illustrates an example system 800 for placement and analysis of a sessile drop, where the drop is placed through an aperture in a surface according to an embodiment of the invention. Like FIGS. 7A-7D, in FIGS. 8A-8C mobile device 808 is placed on a support platform 803 coupled to a support structure 801. The mobile device 808 is held in place on the platform by an adjustable clamping mechanism 805. The height of the platform 803 is adjustable by a sliding mechanism 804 supported by rods 802.

The support structure 801 is coupled to a rod extending in an outward direction from the mobile device 808. A platform 810 and syringe holder 809 are removably coupled to the rod, and the distance of the platform 810 and syringe holder 809 from the mobile device 808 being adjustable. A syringe 811 is placed inside a groove of syringe holder 809 and may be fixed in place by tightening thumb screw 807. In some embodiments, the groove is shaped to fit the syringe holder 809. In some embodiments, syringe holder 809 includes an aperture shaped to fit the syringe 811. The needle of syringe 811 is angled to fit within a right angle groove in platform 810 and the syringe 811 can be operated to deposit a drop of fluid onto the top of platform 810 on a test surface through an aperture within the test surface. The shape of the aperture may be circular, elliptical, square, or any other shape known to a person skilled in the art. Variations of the system shown in FIG. 8 are also contemplated. For example, in a variation, platform 810 may have an internal tube designed to accept on one end the tip of a standard syringe needle angled tube and to transport fluids output from the syringe needle onto the top of platform 810.

FIGS. 9A-9D illustrates an example system 900 for placement and analysis of a drop on a tilted surface according to an embodiment of the invention. Like FIG. 7, in FIG. 9, mobile device 903 is placed on a support platform 917 coupled to a support structure 912. The mobile device 903 is held in place on the platform by an adjustable clamping mechanism 910. The height of the platform 917 is adjustable by a sliding mechanism 911 supported by rods 909.

The support structure 912 is coupled to a pair of rods 902 extending in an outward direction from the mobile device 903. A platform assembly 906 is removably coupled to the pair of rods 902, and the distance of the platform assembly 906 from the mobile device 903 is adjustable. Optionally, the pair of rods 902 can be removed from the support structure 912 when the platform assembly is not needed by loosening thumb screw 905. An inclined flat surface 901 with an adjustable angle of inclination around an axis parallel to the pair of rods is mounted to platform assembly 906.

In this embodiment, the platform assembly 906 includes a rotatable shaft 920. In this embodiment, the rotatable shaft 920 is integrated into platform assembly 906. In other embodiments, the rotatable shaft 920 is not integrated into platform assembly 906 but is biased against it instead. In the illustrated embodiment, the platform assembly 906 includes a torque spring 908 that provides torque for platform assembly 906. The system 900 also includes an adjustment member 930. In this embodiment, the adjustment member 930 is a screw that is mounted vertically over the platform assembly 906.

In this embodiment, platform assembly 906 includes a protruding member 934 which engages the adjustment member 930 for adjustment of the angle of the platform assembly 906 relative to the horizontal plane. The adjustment member 930 is mounted vertically over protruding member 934 and the height is adjusted for engagement with the platform assembly 906. As illustrated, when adjustment member 930 is at its lowest position, the flat surface 901 in platform assembly 906 is parallel to the horizontal. When adjustment member 906 is at a position such that it no longer engages the protruding member 934 of the platform assembly 906, the flat surface 901 in the platform assembly 906 is at its maximum angle relative to the horizontal.

While the embodiment illustrated in FIGS. 9A-9F requires manual adjustment of adjustment member 930, in other embodiments, the movement of adjustment member 930 can be actuated using an actuator driven by a motor and the like. In some embodiments, the movement of adjustment member 930 may be controlled by the mobile device 903 through instructions issued wirelessly to the actuator. In some embodiments, the motor may be operated independently of the mobile device.

The support structure 912 includes a horizontal rod 904 along which is mounted an arm 916, the arm 916 having a syringe-holding extension 915 for supporting a syringe 913. The height of syringe 913 within the syringe-holding extension 915 is adjustable, with the syringe being fixable in place at a given height by a thumb screw. The syringe-holding extension 915 is movable outwards from the support structure 912 along the length of arm 916 to adjust the distance of the syringe from the camera. Syringe 913 may be operated to place a droplet on a test surface placed on the inclined surface 901 within view of the camera of mobile device 903 for analysis.

Figure 10A:
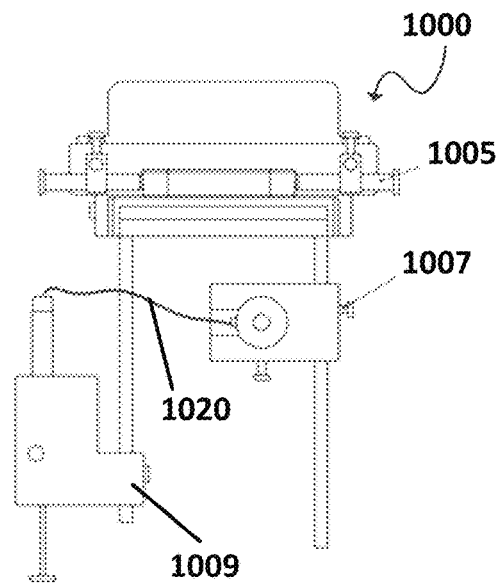
Figure 10B:
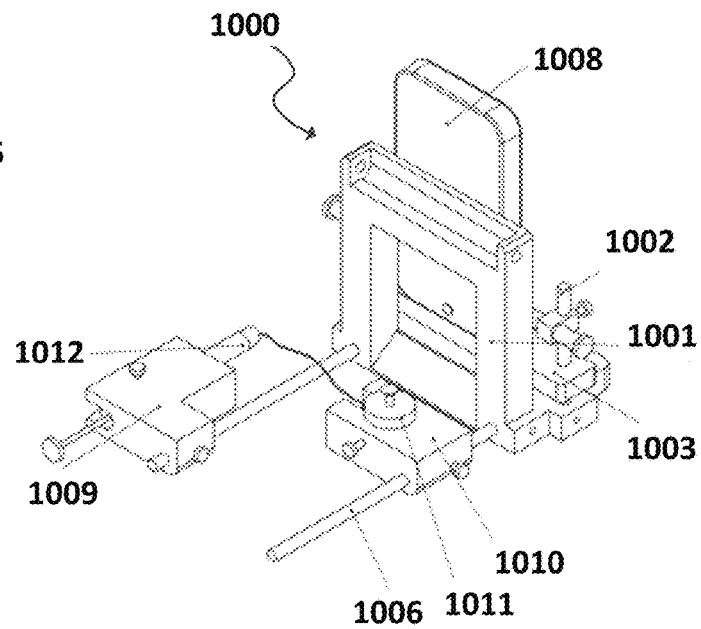
Figure 10C:
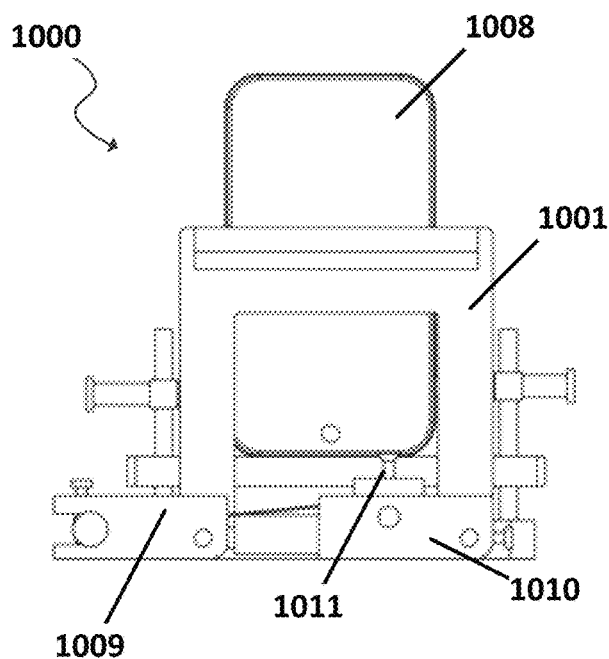

FIGS. 10A-10C illustrates an example system 1000 for placement and analysis of a constrained sessile drop according to an embodiment of the invention. Like FIG. 7, in FIG. 10, mobile device 1008 is placed on a support platform 1003 coupled to a support structure 1001. The mobile device 1008 is held in place on the platform 1003 by an adjustable clamping mechanism 1005. The height of the platform 1003 is adjustable by a sliding mechanism supported by rods 1002.

The support structure 1001 is coupled to a pair of rods 1006 extending in an outward direction from the mobile device 1008. A platform 1010 having a pedestal 1011 for holding a constrained sessile drop is removably mounted along one of the rods 1006 and the distance of the platform 1010 from the mobile device 1008 is adjustable. Platform 1010 can be fixed in place at a given distance by thumb screw 1007. A syringe holder 1009 is slidably mounted along the other one of the rods 1006. Optionally, there may be only a single rod and the syringe holder 1009 is removably mounted on the same rod as the platform 1010. The syringe holder 1009 contains a groove shaped to accept a syringe 1012 that can be fixed into place with a thumb screw. In some embodiments, the syringe holder 1009 includes an aperture shaped to fit the syringe 1012. The syringe 1012 is coupled by a flexible conduit 1020 to platform 1010 so that when the syringe is depressed, liquid from the syringe can be deposited on the top of pedestal 1011 as a constrained sessile drop within view of the camera of mobile device 1008 for analysis. Withdrawing the plunger of the syringe 1017 will allow for reduction of volume of the droplet or manipulation of the size of the droplet. In some embodiments, a soft grip is provided to aid with holding and accommodating mobile device 1008 having different shapes and/or screen sizes.

FIGS. 11A-11F illustrates another example system 1100 for placement and analysis of a sessile drop, a pendant drop, a droplet suspended in an immiscible fluid, or a captive bubble in a fluid according to an embodiment of the invention. In this embodiment, a mobile device 1104 is placed in a clamping mechanism coupled to a support structure 1101. The mobile device is held in place by adjustable device holding supports 1102, 1103. A spring 1106 held in place by fastener 1105 provides compression between mobile device holding supports 1102, 1103, and device holding support 1103 is affixed to support structure 1101 by another adjustable fastener 1107. In some embodiments, a soft grip is provided to aid with holding and accommodating mobile device 1104 having different shapes and/or screen sizes.

The support structure 1101 is connected to a pair of rods 1108 extending in an outward direction from the mobile device 1104, providing a track on which a syringe holding structure 1109 slides, so that the distance from the syringe holding structure 1109 and the mobile device 1104 is adjustable. Rods 1108 can be disconnected and removed from support structure 1101 by loosening attachment fasteners 1118. A second rod 1110 oriented perpendicularly to the pair of rods 1108 extends along the top of syringe holding structure 1109 and provides a track along which a syringe holder 1111 having a syringe holding clamp 1116 slides. A syringe 1117 is releasably held in clamp 1116. Clamp 1116 allows for adjusting the height of the syringe 1117 in the vertical direction.

A motor 1112 is connected to a rotating portion that interacts with a gripping part 1114 slidably mounted to post 1113. When the motor 1112 is actuated, gripping part 1114 causes a downward pressure to be exerted on a syringe adjustment member 1115 which in turn acts on the plunger of the syringe 1117, thereby causing liquid to be released from syringe 1117.

In some embodiments, the motor 1112 can be controlled to retreat the plunger of the syringe 1117. In some embodiments, when the motor moves forward, syringe adjustment member 1115 moves downwards and the plunger in syringe 1117 is depressed and volume is added to the droplet; when the motor reverses direction, syringe adjustment member 1115 moves upwards and the plunger in syringe 1117 is withdrawn and volume is removed. This allows multiple volume addition or removal to be done (i.e., droplet manipulation). In some embodiments, motor 1112 is wirelessly controlled by an application on mobile device 1104, for example through wireless communication protocols, such as Bluetooth, Wi-Fi, or the like. In other embodiments, the system may include a physical button for manual actuation of motor 1112.

FIGS. 12A-12F illustrate another example system 1200 for placement and analysis of a sessile drop, a pendant drop, a droplet suspended in an immiscible fluid, or a captive bubble within a fluid according to an embodiment of the invention. Similar to the embodiment shown in FIGS. 11A-11F, a mobile device 1204 is placed in a clamping mechanism coupled to a support structure 1201. The mobile device 1204 is held in place by adjustable device holding supports 1202, 1203. A spring 1206 held in place by fastener 1205 provides compression between device holding supports 1202, 1203, and device holding support 1202 is affixed to support structure 1201 by another adjustable fastener 1207. In some embodiments, a soft grip is provided to aid with holding and accommodating mobile device 1204 having different shapes and/or screen sizes.

The support structure 1201 is connected to a pair of rods 1208 extending in an outward direction from the mobile device 1204, providing a track on which a syringe holding structure 1209 slides, so that the distance from the syringe holding structure 1209 and the mobile device 1204 is adjustable. Rods 1208 can be disconnected and removed from support structure 1201 by loosening attachment fasteners 1218. A second rod 1210 oriented perpendicularly to the pair of rods 1208 extends along the top of syringe holding structure 1209 and provides a track along which a syringe holder 1211 having a syringe holding clamp 1216 slides. A syringe 1217 is releasably held in clamp 1216. Clamp 1216 allows for adjusting the height of the syringe 1217 in the vertical direction.

A motor 1212 is connected to a rotating portion that interacts with a gripping part 1214 slidably mounted to post 1213. When the motor is actuated, gripping part 1214 causes a downward pressure to be exerted on a syringe adjustment member 1215 which in turn acts on the plunger of syringe 1217, thereby causing liquid to be released from syringe 1217. In some embodiments, the motor 1212 can be controlled to retreat the plunger of the syringe 1217. In some embodiments, when the motor moves forward, syringe adjustment member 1215 moves downwards and the plunger in syringe 1217 is depressed and volume is added to the droplet; when the motor reverses direction, syringe adjustment member 1215 moves upwards and the plunger in syringe 1217 is withdrawn and volume is removed. This allows multiple volume addition or removal to be done (i.e., droplet manipulation).

This embodiment includes a removably couplable sample support member 1220 that is operatively connected to the syringe holding structure 1209. In this embodiment, the sample support member 1220 includes an aperture through which a connection member 1208 is inserted. The connection 1208 is operatively connected to syringe holding structure 1209. In some embodiments, the sample support member 1220 holds a test surface for placing droplets on top. In some embodiments, the sample support member 1220 allows insertion of a needle from below, such as through the use of a flexible conduit connected to the syringe. In some embodiments, motor 1212 is wirelessly controlled by an application on mobile device 1204, for example through wireless communication protocols, such as Bluetooth, Wi-Fi, or the like. In other embodiments, the system may include a physical button for manual actuation of motor 1212.

FIGS. 13A-13F illustrate another example system 1300 for placement and analysis of a sessile drop, a pendant drop, a droplet suspended in an immiscible fluid, or a captive bubble within a fluid according to an embodiment of the invention. Similar to the embodiment shown in FIGS. 13A-13F, a mobile device 1304 is placed in a clamping mechanism coupled to a support structure 1301. The mobile device 1304 is held in place by adjustable device holding supports 1302, 1303. A spring 1306 held in place by fastener 1305 provides compression between device holding supports 1302, 1303, and device holding support 1303 is affixed to support structure 1301 by another adjustable fastener 1307. In some embodiments, a soft grip is provided to aid with holding and accommodating mobile device 1304 having different shapes and/or screen sizes.

The support structure 1301 is connected to a pair of rods 1308 extending in an outward direction from the mobile device 1304, providing a track on which a syringe holding structure 1309 slides, so that the distance from the syringe holding structure 1309 and the mobile device 1304 is adjustable. Rods 1308 can be disconnected and removed from support structure 1301 by loosening attachment fasteners 1318. In contrast to the embodiment illustrated in FIGS. 12A-12F, in this embodiment, the system includes two syringes 1317a and 1317b and corresponding first syringe holder 1311a and second syringe holder 1311b. Each of first syringe holder 1311a and second syringe holder 1311b has syringe holding clamps 1316a and 1316b, respectively. Clamps 1316a and 1316b allow for adjusting the height of the syringe 1317a and 1317b in the vertical direction, respectively.

A second rod 1310 oriented perpendicularly to the pair of rods 1308 extends along the top of syringe holding structure 1309 and provides a track along which the first syringe holder 1311a and the second syringe holder 1311b slides. Each of syringe 1317a and 1317b is releasably held in syringe holding clamps 1316a and 1316b. Each of motors 1312a and 1312b is connected to a respective rotating portion that interacts with a first gripping part 1314a and second gripping part 1314b, respectively, that is slidably mounted to post 1313a and 1313b, respectively. When the first motor 1312a is actuated, gripping part 1314a causes a downward pressure to be exerted on first syringe adjustment member 1315a which in turn acts on the plunger of the first syringe 1317a, thereby causing liquid to be released from the first syringe 1317a. In the illustrated embodiment, second motor 1312b, gripping part 1314b, syringe adjustment member 1315b, and second syringe 1317b operates in the same manner.

In some embodiments, first motor 1312a and second motor 1312b can be controlled to retreat the respective plungers of the first syringe 1317a and the second syringe 1317b. When the first motor 1312a moves forward, first syringe adjustment member 1315a moves downwards and the plunger in first syringe 1317a is depressed and volume is added to the droplet; when the first motor 1312a reverses direction, the first syringe adjustment member 1315a moves upwards and the plunger in first syringe 1317a is withdrawn and volume is removed. This allows multiple volume addition or removal to be done (i.e., drop manipulation). In the illustrated embodiment, second motor 1312b, syringe adjustment member 1315b, and second syringe 1317b operate in the same manner.

This embodiment includes a sample support member 1320 that is operatively connected to the syringe holding structure 1309. In this embodiment, the sample support member 1320 includes an aperture through which a connection member 1308 is inserted. The connection 1308 is operatively connected to syringe holding structure 1309. In some embodiments, the sample support member 1320 holds a test surface for placing droplets on top. In some embodiments, the sample support member 1320 allows insertion of a needle from below, such as through the use of a flexible conduit connected to the syringe. In some embodiments, motor 1312a, 1312b is wirelessly controlled by an application on mobile device 1304, for example through wireless communication protocols, such as Bluetooth, Wi-Fi, or the like. In other embodiments, the system may include a physical button for manual actuation of first motor 1312a or second motor 1312b.

While the illustrated embodiment shows two syringes, in other embodiments, more than 2 syringes may be used. The syringes may also be operated separately or operated using different mechanisms.

FIGS. 14A-14F illustrate another example system 1400 for placement and analysis of constrained sessile drop according to an embodiment of the invention. Similar to the embodiment shown in FIGS. 12A-12F, a mobile device 1404 is placed on a clamping mechanism coupled to a support structure 1401. The mobile device 1404 is held in place by adjustable device holding supports 1402, 1403. A spring 1406 held in place by fastener 1405 provides compression between device holding supports 1402, 1403, and device holding support 1403 is affixed to support structure 1401 by another fastener 1407. In some embodiments, a soft grip is provided to aid with holding and accommodating mobile device 1404 having different shapes and/or screen sizes.

The support structure 1401 is connected to a pair of rods 1408 extending in an outward direction from the mobile device 1404, providing a track on which a syringe holding structure 1409 slides, so that the distance from the syringe holding structure 1409 and the mobile device 1404 is adjustable. Rods 1408 can be disconnected and removed from support structure 1401 by loosening attachment fasteners 1418. A second rod 1410 oriented perpendicularly to the pair of rods 1408 extends along the top of syringe holding structure 1409 and provides a track along which a syringe holder 1411 having a syringe holding clamp 1416 slides. A syringe 1417 is releasably held in clamp 1416.

A motor 1412 is connected to a rotating portion that interacts with a gripping part 1414 slidably mounted to post 1413. When the motor is actuated, gripping part 1414 causes a downward pressure to be exerted on a syringe adjustment member 1415 which in turn acts on the plunger of syringe 1417, thereby causing liquid to be released from syringe 1417. Clamp 1416 allows for adjusting the height of the syringe 1417 in the vertical direction.

In some embodiments, the motor 1412 can be controlled to retreat the plunger of the syringe 1417. In some embodiments, when the motor moves forward, syringe adjustment member 1415 moves downwards and the plunger in syringe 1417 is depressed and volume is added to the droplet; when the motor reverses direction, syringe adjustment member 1415 moves upwards and the plunger in syringe 1417 is withdrawn and volume is removed. This allows multiple volume addition or removal to be done (i.e., drop manipulation). In some embodiments, motor 1412 is wirelessly controlled by an application on mobile device 1404, for example through wireless communication protocols, such as Bluetooth, Wi-Fi, or the like. In other embodiments, the system may include a physical button for manual actuation of motor 1412.

In this embodiment, the syringe 1417 is operatively connected to a constraint sessile drop generator 1420 positioned on a constraint stage 1419. In this embodiment, syringe 1417 is connected to the constraint drop generator 1420. Flexible conduit 1450 is fastened in place by fastener 1429 and can be removed from constraint stage 1419 by loosening fastener 1429. The distance between mobile device 1404 and constraint stage 1419 is adjustable. The constraint stage 1419 is operatively connected to the syringe holding structure 1409. In operation, the constraint drop generator 1420 generates a liquid drop (after it has been released from the syringe) and the pedestal above the drop generator holds the liquid drop while measurements are made using the mobile device 1404 using the mobile device software disclosed herein.

FIGS. 15A-15F illustrates another system 1500 for placement and analysis of a drop on a tilted surface according to an embodiment of the invention. Similar to other embodiments, a mobile device 1504 is placed on a clamping mechanism coupled to a support structure 1501. The mobile device 1504 is held in place by adjustable device holding supports 1502, 1503. A spring 1506 held in place by fastener 1505 provides tension between device holding supports 1502, 1503, and device holding support 1503 is affixed to support structure 1501 by another adjustable fastener 1507. In some embodiments, a soft grip is provided to aid with holding and accommodating mobile device 1504 having different shapes and/or screen sizes.

The support structure 1501 is connected to a pair of rods 1508 extending in an outward direction from the mobile device 1504, providing a track on which a syringe holding structure 1509 slides, so that the distance from the syringe holding structure 1509 and the mobile device 1504 is adjustable. Rods 1508 can be disconnected and removed from support structure 1501 by loosening attachment fasteners 1530. A second rod 1510 oriented perpendicularly to the pair of rods 1508 extends along the top of syringe holding structure 1509 and provides a track along which a syringe holder 1511 having a syringe holding clamp 1516 slides. A syringe 1517 is releasably held in clamp 1516.

A motor 1512 is connected to a rotating portion that interacts with a gripping part 1514 slidably mounted to post 1513. When the motor is actuated, gripping part 1514 causes a downward pressure to be exerted on a syringe adjustment member 1515 which in turn acts on the plunger of the syringe 1517, thereby causing liquid to be released from syringe 1517. Clamp 1516 allows for adjusting the height of the syringe 1517 in the vertical direction.

In some embodiments, the motor 1512 can be controlled to retreat the plunger of the syringe 1517. In some embodiments, when the motor moves forward, syringe adjustment member 1515 moves downwards and the plunger in syringe 1517 is depressed and volume is added to the droplet; when the motor reverses direction, syringe adjustment member moves upwards and the plunger in syringe 1517 is withdrawn and volume is removed. This allows multiple volume addition or removal to be done (i.e., droplet manipulation). In In some embodiments, motor 1512 is wirelessly controlled by an application on mobile device 1504, for example through wireless communication protocols, such as Bluetooth, Wi-Fi, or the like. In other embodiments, the system may include a physical button for manual actuation of motor 1512.

In this embodiment, the system includes a tiltable stage member 1518. In this embodiment, the tiltable stage member 1518 includes 2 apertures sized for removable engagement with rods 1508. The tiltable stage member 1518 includes a rotatable shaft 1519. In this embodiment, the rotatable shaft 1519 is integrated into tiltable stage 1520. In other embodiments, the rotatable shaft 1519 is not a part of the tiltable stage 1520 but is biased against it instead. In the illustrated embodiment, the tiltable stage member 1518 includes a torque spring 1522 that provides torque for tiltable stage 1520. Tiltable stage member 1518 includes an adjustment member 1521. In some embodiments, the rotatable shaft 1519 is configured to rotate and maintain the tiltable stage 1520 at specific positions without the use of adjustment member 1521. In some embodiments, the rotatable shaft 1519 is controllable using by an application on mobile device 1504, for example through wireless communication protocols, such as Bluetooth, Wi-Fi, or the like.

In this embodiment, tiltable stage 1520 includes a protruding member 1550 which engages the adjustment member 1521 for adjustment of the angle of the tiltable stage 1520 relative to the horizontal plane. The adjustment member 1521 is mounted vertically on tiltable stage member 1518 and the height is adjusted for engagement with the tiltable stage 1520. As illustrated, when adjustment member 1521 is at its lowest position, the tiltable stage 1520 is parallel to the horizontal. When adjustment member 1521 is at a position such that it no longer engages the protruding member of the tiltable stage 1520, the tiltable stage 1520 is at its maximum angle relative to the horizontal. In some embodiments, the distance between tiltable stage 1520 and the mobile device 1504 can be varied. In some embodiments, the distance between tiltable stage member 1518 and the mobile device 1504 can be varied.

While the embodiment illustrated in FIGS. 15A-15F requires manual adjustment of adjustment member 1521, in other embodiments, the movement of adjustment member 1521 can be actuated using an actuator driven by a motor and the like. In some embodiments, the movement of adjustment member 1521 may be controlled by the mobile device 1504 through instructions issued wirelessly to the actuator.

In the illustrated embodiment, the liquid from syringe 1517 is used to place a droplet on the test surface on top of the tiltable 1520 and the mobile device 1504 can capture images of such droplet.

FIGS. 16A-16F illustrates another system 1600 for placement and analysis of a captive bubble according to an embodiment of the invention. In this embodiment, a mobile device 1604 is placed on a clamping mechanism coupled to a support structure 1601 and held in place by adjustable device holding supports 1602, 1603. A spring 1606 held in place by fastener 1605 provides compression between device holding supports 1602, 1603, and device holding support 1603 is affixed to support structure 1601 by another adjustable fastener 1607. In some embodiments, a soft grip is provided to aid with holding and accommodating mobile device 1604 having different shapes and/or screen sizes.

The support structure 1601 is connected to a pair of rods 1608 extending in an outward direction from the mobile device 1604, providing a track on which a syringe holding structure 1609 slides, so that the distance from the syringe holding structure 1609 and the mobile device 1604 is adjustable. Rods 1608 can be disconnected and removed from support structure 1601 by loosening attachment fasteners 1618. A second rod 1610 oriented perpendicularly to the pair of rods 1608 extends along the top of syringe holding structure 1609 and provides a track along which a syringe holder 1611 having a syringe holding clamp 1616 slides. A syringe 1617 is releasably held in clamp 1616. Clamp 1616 allows for adjusting the height of the syringe in the vertical direction.

A motor 1612 is connected to a rotating portion that interacts with a gripping part 1614 slidably mounted to post 1613. When the motor 1612 is actuated, gripping part 1114 causes a downward pressure to be exerted on a syringe adjustment member 1615 which in turn acts on the plunger of the syringe 1617, thereby causing liquid to be released from syringe 1617.

In some embodiments, the motor 1612 can be controlled to retreat the plunger of the syringe 1617. In some embodiments, when the motor moves forward, syringe adjustment member 1615 moves downwards and the plunger in syringe 16117 is depressed and volume is added to the droplet; when the motor reverses direction, syringe adjustment member 1615 moves upwards and the plunger in syringe 1617 is withdrawn and volume is removed. This allows multiple volume addition or removal to be done (i.e., droplet manipulation). In some embodiments, motor 1612 is wirelessly controlled by an application on mobile device 1604, for example through wireless communication protocols, such as Bluetooth, Wi-Fi, or the like. In other embodiments, the system may include a physical button for manual actuation of motor 1612.

In this embodiment, the system includes a removably couplable illumination source 1660. The illumination source 1660 can be a lighting module mounted with LED lights, but other light sources known to a person skilled in the art can be used. As illustrated in FIGS. 16A-16F, the light source 1660 is mounted on a light source support member 1662. In this embodiment, light source support member 1662 includes two apertures through which rods 1608 can be inserted for removable coupling to the system. In some embodiments, the light source 1660 is controlled manually (e.g., for on/off of the light source 1660, intensity of the light source 1660, and the like). In some embodiments, the illumination source 1660 is controlled through the use of a mobile device application operating on the mobile device 1604. In some embodiments, at least one of intensity or duration of light emitting from the illumination source 1660 is controlled through the use of a mobile device application operating on the mobile device 1604.

The system illustrated in FIGS. 16A-16F also includes liquid container 1670 which is used for forming and monitoring captive bubbles. The liquid container 1670 includes a storage cavity 1672 for storing liquid in which a droplet or bubble can be suspended. The liquid container 1670 includes support members 1674 which contains apertures for insertion of rods 1608 to allow removable coupling to the system. Support members 1674 can be used to adjust the distance of liquid container 1670 from the mobile device 1604 so as to have a desirable distance from the camera of the mobile device 1670.

According to one aspect of the invention, there is provided a kit including a support structure for a mobile device and one or more of the measurement components. In some embodiments, the kit includes the support structure for a mobile device and at least one of the measurement components. In some embodiments, the kit includes systems 1100, 1200, 1300, 1400, 1500, 1600, or a combination of any of the foregoing.

While the embodiments described herein uses a clamping mechanism for holding the mobile device, other mechanical mechanisms, including different types of fasteners can be used. In some embodiments, the support is shaped to receive mobile devices having a range of screen sizes, including mobile devices having displays with diagonal lengths of 4" or greater. In some embodiments, the support includes removable adhesives to hold the mobile device. In some embodiments, the support includes hooks-and-loop fasteners. In some embodiments, the support is shaped to receive mobile devices of a specific size. In some embodiments, the system includes a sleeve for fitting a mobile device and the sleeve is configured for removable coupling to the support.

When a system disclosed herein, such as system 700, 800, 900, 1000, 1100, 1200, 1300, 1400, 1500, or 1600, is used, a user inserts a mobile device having a camera into the support. The user then couples the appropriate measurement component to the support. For instance, if the user wishes to analyze bubbles, the measurement component from system 1600 may be used. The user then places a droplet or a bubble on or within the measurement component and within the camera's field of view. The mobile device can be operated using a mobile device application, such as that disclosed in FIGS. 2A-2J and 4A-4D, to cause the camera to take an image of the droplet or the bubble and determine one or more physical properties of the droplet or the bubble based on an analysis of the image. In some embodiments, the captured images are calibrated by the mobile device application used to capture the image and analyse the data.

While a number of exemplary aspects and implementations have been discussed above, those skilled in the art will recognize certain modifications, permutations, additions, sub-combinations thereof, including:

The measurements calculated by the mobile device can be stored locally on the device or be communicated to external storage locations, including on servers in the cloud, a remote computer, a remote private server, and/or the like.

While systems described herein use rods and apertures shaped to fit the rods for removable or adjustable coupling of measurement components, any other systems for removable coupling of mechanical components may be used, including components having male and female portions, interlocking portions, adhesives, and the like, or a combination of any of the foregoing.

The different components of the system can be assembled using pre-fabricated parts; in some embodiments, the components can be 3D printed.

The different components of the system can be made of plastic, metal, composites, or a combination of any of the foregoing.

While the embodiments illustrated in the drawings use a syringe for injecting fluids, other fluid injectors known to a person skilled in the art may be used.

Motors, actuators, measurement components, and/or other members of the system that are controllable by the mobile device, or independently from the mobile device, can receive instructions from a receiver operatively connected to such components and the receivers are configured to receive signals transmitted wirelessly by the mobile device (including through wireless communication protocols) or by other manners known to a person skilled in the art.

While screws are used as fasteners in some of the embodiments described herein, other type of fasteners known to a person skilled in the art may be used.

The location and/or positions of different components described in systems 700, 800, 900, 1000, 1100, 1200, 1300, 1400, 1500, or 1600 may be independently controllable through the use of motors or other actuators for adjusting the location and/or position of the components and sensors for receiving instructions through wireless communication protocols from a mobile device application operating on the mobile device used to capture the image of the droplet or independently of such device.

Some advantages of the embodiments described herein include:

The systems and methods disclosed herein allow for measurement and analysis of interfacial tension, contact angle, advancing contact angle, receding contact angle, solid surface energy, sliding angle, droplet or bubble surface area or volume, or a combination of some or all of the foregoing.

The modular nature of the system and two or more measurement components allow different types of measurements to be made using a single system.

The systems and methods described herein can be more cost-effective than commercially available apparatuses.

INTERPRETATION OF TERMS

Unless the context clearly requires otherwise, throughout the description and the "comprise", "comprising", and the like are to be construed in an inclusive sense, as opposed to an exclusive or exhaustive sense; that is to say, in the sense of "including, but not limited to"; "connected", "coupled", or any variant thereof, means any connection or coupling, either direct or indirect, between two or more elements; the coupling or connection between the elements can be physical, logical, or a combination thereof; "herein", "above", "below", and words of similar import, when used to describe this specification, shall refer to this specification as a whole, and not to any particular portions of this specification; "or", in reference to a list of two or more items, covers all of the following interpretations of the word: any of the items in the list, all of the items in the list, and any combination of the items in the list; the singular forms "a", "an", and "the"also include the meaning of any appropriate plural forms.

Embodiments may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, smartphones, tablet computers, image data encoders, image data decoders, PDAs, color-grading tools, video projectors, audio-visual receivers, displays (such as televisions), digital cinema projectors, media players, and other devices suitable for the purposes described herein. Those skilled in the relevant art will appreciate that aspects of the system can be practised with other communications, data processing, or computer system configurations, including: Internet appliances, hand-held devices, wearable computers, all manner of cellular or mobile phones, multi-processor systems, microprocessor-based or programmable consumer electronics (e.g., video projectors, audio-visual receivers, displays, such as televisions, and the like), set-top boxes, color-grading tools, network PCs, mini-computers, mainframe computers, and the like.

The invention may also be provided in the form of a program product. The program product may comprise any non-transitory medium which carries a set of computer-readable instructions which, when executed by a data processor, cause the data processor to execute a method. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, imaging sensor, position sensor, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

Although the invention has been described with reference to certain specific embodiments, various modifications thereof will be apparent to those skilled in the art without departing from the principles of the invention.

REFERENCES

1. *Physical Chemistry of Surfaces*, 6th Edition, A. W. Adamson, A. P. Gast, 1997, Wiley, NY, USA.
2. *Applied Surface Thermodynamics*, 2nd Edition, A. W. Neumann, R David, Y Zuo, 2010, CRC Press, NY, USA.
3. A. W. Neumann, in: J. F. Padday (Ed.), *Wetting, Spreading and Adhesion*, Academic Press, New York, 1978.
4. R. J. Good, in: R. J. Good, R. R. Stromberg (Eds.), *Surface Colloid Sci, vol.* 11, Plenum Press, New York, 1979.
5. A. Marmur, *Adv. Colloid Interface Sci.*, 19, 75, 1983.
6. G. Wolansky, A. Marmur, *Langmuir*, 14, 5292, 1998.
7. C. N. C. Lam, J. Y. Lu, A. W. Neumann, Measuring Contact Angle, in: K. Holmberg, M. J. Schwuger, D. O. Shah (Eds.), *Handbook of Applied Surface and Colloid Chemistry, Part 5: Analysis in Surfactant Chemistry*, Wiley, Europe 2001.
8. A. Amirfazli, S. Hanig, A. Müller, A. W. Neumann, *Langmuir*, 16, 2024, 2000.
9. S. Madani, A. Amirfazli, *Colloid Surfaces A*, 441, 796, 2014.
10. H Chen, T. Tang, A. Amirfazli, *Phys. Fluids*, 27, 112102, 2015.
11. A. J. B. Milne, J. A. W. Elliott, P. Zabeti, J. Zhou, A. Amirfazli, *Phys. Chem. Chem. Phys.* 13, 16208, 2011.
12. R. Shetty, R. Balasubramanian, W. R. Wilcox, *J. Crystal Growth*, 100, 58, 1990.
13. Y. Y. Zuo, C. Do. A. W. Neumann, *Colloids and Surfaces A*, 299,109, 2007.
14. *Global Surface Tension Meters Consumption* 2016 *Market Research Report*, QYR Machinery & Equipment Research Center, March 2016.
15. J. Drelich, *Surface Innovations*, 1, 248, 2013.
16. Y. Rotenberg, L. Boruvka, A. W. Neumann, *J. Colloid Interface Sci.* 93, 169, 1983.
17. E. Pierce, F. J. Carmona, A. Amirfazli, "Understanding of Sliding and Contact Angle Results in Tilted Plate Experiments", *Colloids Surfaces A*, 323, 73-82, 2008.
18. S. M. I. Saad, Z. Policova, E J. Acosta, A. W Neumann, *Langmuir*, 26, 14004, 2010.
19. D. Biolè, V. Bertola, *Colloids Surfaces A*, 467, 149, 2015.
20. Mobile Surface Analyzer from Kruss, www.kruss.de/products/contact-angle/mobile-surface-analyzer-msa/ (accessed Mar. 26, 2016).
21. "Contact Angle Measurement" application by Tomoyuki Mikami, Apple iTunes App Store.
22. D. Williams, A. Kuhn, T. O'Bryon, M. Konarik, J. Huskey, *Galvanotechnik*, 8, 1718, 2011.

The invention claimed is:

1. A system for analyzing one or more physical properties of a droplet or a bubble comprising:
   a support adapted to receive a mobile device comprising a camera and a processor,
   a structure removably couplable to the support, the structure comprising a surface and a syringe holder, the syringe holder adapted to receive a syringe, the syringe configurable to place the droplet or the bubble on the surface for measurement of one or more physical properties of the droplet or the bubble, the structure comprising a mechanism to adjustably move the syringe holder relative to the camera such that the droplet or the bubble is within a field of view of the camera, wherein the processor is configured to
operate the camera to take an image of the droplet or the bubble within the field of view;
analyze the image to determine an edge property of at least one edge of the droplet or the bubble: and
determine the one or more physical properties of the droplet or the bubble by matching the edge property with a solution for a Laplace equation based on the droplet or the bubble measured from the image.

2. The system of claim 1, wherein the mobile device comprises a smartphone or a tablet computer.

3. The system of claim 1, wherein the one or more physical properties comprises one or more surface thermodynamic properties.

4. The system of claim 1, wherein the surface comprises at least one of a horizontal surface, a tiltable surface, or a component for supporting a droplet on a surface having a constrained area.

5. The system of claim 1, wherein the structure comprises at least one of a component for generating or manipulating the volume or size of a droplet on a horizontal surface, a component for generating or manipulating the volume or size of a droplet on a tiltable surface, a component for generating or manipulating the volume or size of a pendant droplet, or a component for generating or manipulating the volume or size of a droplet on a surface having a constrained area.

6. The system of claim 1, wherein the structure comprises at least one of a component for supporting a captive bubble, a component for supporting a bubble floating within a fluid, a component for injecting a bubble into a fluid, or a component for deforming a bubble within a fluid by means of an external force.

7. The system of claim 1, wherein the determined one or more physical properties is interfacial tension, contact angle, advancing contact angle, receding contact angle, solid surface energy, sliding angle, droplet or bubble surface area, droplet or bubble volume, or apex curvature.

8. The system of claim 1, wherein determining the one or more physical properties by mathematical calculation comprises analyzing the droplet or the bubble shape based on solving the Laplace equation or based on polynomial or curve fitting techniques.

9. The system of claim 1, wherein the structure is further configured to removably receive an illumination source for the droplet or the bubble.

10. The system of claim 1, wherein the structure comprises one or more motors controllable by the mobile device for adjusting the position of the syringe relative to the camera.

11. The system of claim 10, wherein the mobile device and the structure are adapted to communicate through a wireless communication protocol for controlling the motor.

12. The system of claim 1, wherein the structure comprises one or more actuators controllable by the mobile device for at least one of injection, withdrawal, or volume or size manipulation of the droplet or the bubble.

13. The system of claim 1, wherein the support adapted to receive a mobile device is adjustable to accommodate at least one of: mobile devices of various sizes, mobile devices having differing camera placements, and mobile devices having various focal length or optics requirements.

14. The system of claim 1, wherein the mobile device comprises an orientation sensor and the processor is configured to use measurements by the orientation sensor to calibrate the image or allow capturing of the image.

15. A method for analyzing one or more physical properties of a droplet or a bubble comprising:
inserting a mobile device having a camera into a support,
coupling a structure to the support, the structure comprising a surface and a syringe holder, the syringe holder adapted to receive a syringe, the syringe configurable to place the droplet or the bubble on the surface for measurement of one or more physical properties of the droplet or the bubble,
adjustably moving the syringe holder relative to the camera such that the droplet or the bubble is within a field of view of the camera,
placing the droplet or the bubble on the surface and within the camera's field of view, and
operating the mobile device to:
cause the camera to take an image of the droplet or the bubble, and
analyze the image to determine an edge property of at least one edge of the droplet or the bubble: and
determine the one or more physical properties of the droplet or the bubble by matching the edge property with a solution for a Laplace equation based on the droplet or the bubble measured from the image.

16. The method of claim 15, comprising operating the mobile device to take the image at an appropriate zoom level for the camera.

17. The method of claim 15, wherein the one or more physical properties comprises one or more surface thermodynamic properties.

18. The method of claim 15, comprising operating the mobile device to cause the camera to take a plurality of images spaced apart in time, and determining the one or more physical properties as a series of dynamic measurements based on analyses of the plurality of images.

19. The method of claim 15, wherein determining the one or more physical properties by mathematical calculation comprises analyzing the droplet or the bubble shape based on solving the Laplace equation or based on polynomial or curve fitting techniques.

* * * * *